(12) United States Patent
Li et al.

(10) Patent No.: US 11,783,198 B2
(45) Date of Patent: Oct. 10, 2023

(54) ESTIMATING THE IMPLICIT LIKELIHOODS OF GENERATIVE ADVERSARIAL NETWORKS

(71) Applicant: Baidu USA, LLC, Sunnyvale, CA (US)

(72) Inventors: Dingcheng Li, Sammamish, WA (US); Shaogang Ren, Redmond, WA (US); Zhixin Zhou, Los Angeles, CA (US); Ping Li, Bellevue, WA (US)

(73) Assignee: Baidu USA LLC, Sunnyvale, CA (US)

( * ) Notice: Subject to any disclaimer, the term of this patent is extended or adjusted under 35 U.S.C. 154(b) by 687 days.

(21) Appl. No.: 16/840,303

(22) Filed: Apr. 3, 2020

(65) Prior Publication Data

US 2021/0319302 A1 Oct. 14, 2021

(51) Int. Cl.
*G06N 3/08* (2023.01)
*G06N 5/04* (2023.01)
*G06N 3/088* (2023.01)
*G06F 18/23213* (2023.01)
*G06N 3/045* (2023.01)

(52) U.S. Cl.
CPC ....... *G06N 3/088* (2013.01); *G06F 18/23213* (2023.01); *G06N 3/045* (2023.01); *G06N 3/08* (2013.01); *G06N 5/04* (2013.01)

(58) Field of Classification Search
CPC .......... G06N 3/08; G06N 3/0454; G06N 5/04; G06K 9/6223
See application file for complete search history.

(56) References Cited

U.S. PATENT DOCUMENTS 4,969,097 A * 11/1990 Levin ...................... G06F 3/023
  400/98
5,724,457 A * 3/1998 Fukushima ............ G06V 30/32
  382/187

(Continued)

OTHER PUBLICATIONS

Krantz & Parks,"Analytical Tools: The Area Formula, the Coarea Formula, and Poincaré Inequalities," [online], [Retrieved Jan. 19, 2021] Retrieved from Internet <URL:. https://link.springer.com/chapter/10.1007/978-0-8176-4679-0_5> 2008. (2pgs).

(Continued)

*Primary Examiner* — Nicholas Augustine
(74) *Attorney, Agent, or Firm* — NORTH WEBER & BAUGH LLP

(57) ABSTRACT

The thriving of deep models and generative models provides approaches to model high dimensional distributions. Generative adversarial networks (GANs) can approximate data distributions and generate data samples from the learned data manifolds as well. Presented herein are embodiments to estimate the implicit likelihoods of GAN models. In one or more embodiments, a stable inverse function of the generator is learned with the help of a variance network of the generator. The local variance of the sample distribution may be approximated by the normalized distance in the latent space. Simulation studies and likelihood testing on data sets validate embodiments, which outperformed several baseline methods in these tasks. An embodiment was also applied to anomaly detection. Experiments show that the embodiments herein can achieve state-of-the-art anomaly detection performance.

20 Claims, 11 Drawing Sheets

(56) References Cited

U.S. PATENT DOCUMENTS

| | | | | |
|---|---|---|---|---|
| 5,805,159 | A * | 9/1998 | Bertram | G06F 3/0237 |
| | | | | 345/169 |
| 5,864,340 | A * | 1/1999 | Bertram | G06F 40/274 |
| | | | | 715/780 |
| 5,959,629 | A * | 9/1999 | Masui | G06F 3/04886 |
| | | | | 715/708 |
| 6,002,390 | A * | 12/1999 | Masui | G06F 3/04886 |
| | | | | 715/810 |
| 6,321,158 | B1 * | 11/2001 | DeLorme | G06Q 10/047 |
| | | | | 701/426 |
| 6,337,698 | B1 * | 1/2002 | Keely, Jr. | G06F 3/0483 |
| | | | | 715/779 |
| 7,171,353 | B2 * | 1/2007 | Trower, II | G06F 3/0237 |
| | | | | 715/256 |
| 7,194,404 | B1 * | 3/2007 | Babst | G06F 40/274 |
| | | | | 704/10 |
| 8,396,582 | B2 * | 3/2013 | Kaushal | G06N 5/04 |
| | | | | 700/100 |
| 10,034,645 | B1 * | 7/2018 | Williams | A61B 5/168 |
| 10,719,301 | B1 * | 7/2020 | Dasgupta | G06V 10/774 |
| 11,030,485 | B2 * | 6/2021 | Karam | G06F 18/2413 |
| 2002/0015042 | A1 * | 2/2002 | Robotham | G06F 3/1454 |
| | | | | 345/581 |
| 2002/0024506 | A1 * | 2/2002 | Flack | G06F 1/163 |
| | | | | 345/169 |
| 2002/0052900 | A1 * | 5/2002 | Freeman | G06F 3/0237 |
| | | | | 715/262 |
| 2002/0156864 | A1 * | 10/2002 | Kniest | H04L 67/04 |
| | | | | 709/227 |
| 2004/0239681 | A1 * | 12/2004 | Robotham | G06F 3/14 |
| | | | | 345/581 |
| 2005/0012723 | A1 * | 1/2005 | Pallakoff | G06F 1/1656 |
| | | | | 345/173 |
| 2005/0195221 | A1 * | 9/2005 | Berger | G06F 16/9577 |
| | | | | 345/660 |
| 2005/0223308 | A1 * | 10/2005 | Gunn | G06F 3/04886 |
| | | | | 707/999.1 |
| 2005/0283364 | A1 * | 12/2005 | Longe | G10L 15/32 |
| | | | | 704/E15.041 |
| 2006/0020904 | A1 * | 1/2006 | Aaltonen | G06F 3/0482 |
| | | | | 715/850 |
| 2006/0026521 | A1 * | 2/2006 | Hotelling | G06F 3/0488 |
| | | | | 715/702 |
| 2006/0026535 | A1 * | 2/2006 | Hotelling | G06F 3/0488 |
| | | | | 715/863 |
| 2006/0026536 | A1 * | 2/2006 | Hotelling | G06F 3/04883 |
| | | | | 715/863 |
| 2006/0095842 | A1 * | 5/2006 | Lehto | G06F 40/242 |
| | | | | 715/259 |
| 2006/0101005 | A1 * | 5/2006 | Yang | G06F 16/9537 |
| 2006/0161870 | A1 * | 7/2006 | Hotelling | G06F 3/0412 |
| | | | | 715/863 |
| 2006/0161871 | A1 * | 7/2006 | Hotelling | G06F 3/0485 |
| | | | | 715/862 |
| 2006/0265648 | A1 * | 11/2006 | Rainisto | G06F 3/0237 |
| | | | | 715/256 |
| 2006/0274051 | A1 * | 12/2006 | Longe | G06F 40/232 |
| | | | | 345/173 |
| 2007/0263007 | A1 * | 11/2007 | Robotham | G06F 3/1454 |
| | | | | 345/581 |
| 2015/0379429 | A1 * | 12/2015 | Lee | G09B 5/00 |
| | | | | 706/11 |
| 2019/0318099 | A1 * | 10/2019 | Carvalho | G06F 21/577 |
| 2020/0372395 | A1 * | 11/2020 | Mahmud | G06F 16/24575 |
| 2022/0012890 | A1 * | 1/2022 | Wu | G06T 7/0012 |

OTHER PUBLICATIONS

A. Krizhevsky, "Learning Multiple Layers of Features from Tiny Images," [online], [Retrieved Jan. 19, 2021] Retrieved from Internet <URL: https://www.cs.toronto.edu/~kriz/learning-features-2009-TR.pdf> 2009. (60pgs).

Kumar et al.,"emi-supervised Learning with GANs: Manifold Invariance with Improved Inference," arXiv preprint arXiv: 1705.08850, 2017. (15pgs).

N. D. Lawrence, "Gaussian Process Latent Variable Models for Visualisation of High Dimensional Data," In Advances in Neural Information Processing Systems (NIPS), 2003. (8pgs).

LeCun et al.,"Gradient-based learning applied to document recognition," In Proceedings of the IEEE, 1998. (47pgs).

Liu et al.,"Isolation Forest," In Proc. of the 8th IEEE International Conference on Data Mining (ICDM), 2008. (10pgs).

Papamakarios et al.,"Masked Autoregressive Flow for Density Estimation,"arXiv preprint arXiv:1705.07057, 2018. (17pgs).

Pedregosa et al.,"Scikit-learn: Machine Learning in Python," Journal of Machine Learning Research 12 (2011), 2825-2830, 2011. (6pgs).

Que & Belkin,"Back to the Future: Radial Basis Function Networks Revisited," In Proc. of the 19th Int'l Conf. on Artificial Intelligence & Statistics (AISTATS), 2016. (13pgs).

Ramesh & LeCun,"Backpropagation for Implicit Spectral Densities," arXiv preprint arXiv:1806.00499, 2018. (13pgs).

Schlegl et al.,"Unsupervised Anomaly Detection with Generative Adversarial Networks to Guide Marker Discovery," arXiv preprint arXiv:1703.05921, 2017. (12pgs).

Schölkopf et al.,"Support Vector Method for Novelty Detection," In Advances in Neural Information Processing Systems (NIPS), 582-588, 1999. (7pgs).

Srivastava et al.,"VEEGAN: Reducing Mode Collapse in GANs using Implicit Variational Learning," arXiv preprint arXiv:1705.07761, 2017. (17pgs).

Yang et al.,"Geodesic Clustering in Deep Generative Models," arXiv preprint arXiv: 1809.04747, 2018. (10pgs).

Ying et al.,"Meta-CoTGAN: A Meta Cooperative Training Paradigm for Improving Adversarial Text Generation," arXiv preprint arXiv:2003.11530, 2020. (9pgs).

Zenati et al.,"Adversarially Learned Anomaly Detection," arXiv preprint arXiv:1812.02288, 2018. (11 pgs).

Zhai et al.,"Deep Structured Energy Based Models for Anomaly Detection," arXiv preprint arXiv:1605.07717, 2016. (10pgs).

Zhou & Raffenroth,"Anomaly Detection with Robust Deep Autoencoders," In Proc. of the 23rd ACM SIGKDD Intl Conf. Knowledge Discovery & Data Mining (KDD), 2017. (10pgs).

Fournier & Guillin,"On the rate of convergence in Wasserstein distance of the empirical measure," arXiv preprint arXiv:1312.2128, 2013. (25pgs).

Germain et al.,"MADE:Masked Autoencoder for Distribution Estimation," arXiv preprint arXiv:1502.03509, 2015. (10pgs).

Goh & Vidal,"Clustering and dimensionality reduction on Riemannian manifolds," In IEEE Computer Society Conference on Computervision & Pattern Recognition, 2008. (7pgs).

Goodfellow et al.,"Deep Learning," MIT Press, 2016. (2pgs).

Grathwohl et al.,"FFJORD: Free-Form Continuous Dynamics for Scalable Reversible Generative Models,"arXiv preprint arXiv:1810.01367, 2018. (13pgs).

Grover et al.,"Flow-GAN: Combining Maximum Likelihood and Adversarial Learning in Generative Models," arXiv preprint arXiv:1705.08868, 2018. (10pgs).

A. J. Hanson, "Graphics gems iv. chapter Geometry for N-dimensional Graphics," Academic Press Professional, Inc. 1994 (2pgs).

Karras et al.,"Progressive Growing of GANs for Improved Quality, Stability, and Variation," arXiv preprint arXiv:1710.10196, 2018. (26pgs).

Kingma & Dhariwal, "Glow: Generative Flow with Invertible 1×1 Convolutions," arXiv preprint arXiv:1807.03039, 2018. (15pgs).

Kingma & Welling,"Auto-Encoding Variational Bayes," arXiv preprint arXiv:1312.6114, 2014. (14pgs).

Akcay et al.,"GANomaly: Semi-supervised Anomaly Detection via Adversarial Training," arXiv preprint arXiv:1805.06725, 2018. (16pgs).

An & Cho,"Variational Autoencoder based Anomaly Detection using Reconstruction Probability," [online], [Retrieved Jan. 18,

(56) References Cited

OTHER PUBLICATIONS

2021]. Retrieved from Internet <URL: http://dm.snu.ac.kr/static/docs/TR/SNUDM-TR-2015-03.pdf> 2015. (18pgs).

Arjovsky et al.,"Wasserstein GAN," arXiv preprint arXiv: 1701.07875, 2017.(32pgs).

Arvanitidis et al.,"Latent Space Oddity: on the Curvature of Deep Generative Models," arXiv preprint arXiv:1710.11379, 2018. (15pgs).

Bai et al.,"Approximability of Discriminators Implies Diversity in GANs," arXiv preprint arXiv:1806.10586, 2019. (45pgs).

Brock et al.,"Large Scale GAN Training for High Fidelity Natural Image Synthesis," arXiv preprint arXiv:1809.11096, 2019. (35pgs).

Chen et al.,"InfoGAN: Interpretable Representation Learning by Information Maximizing Generative Adversarial Nets," arXiv preprint arXiv:1606.03657, 2016. (14pgs).

Dinh et al.,"Density estimation using Real NVP," arXiv preprint arXiv:1605.08803, 2017. (32pgs).

Dua & Graff,"UCI Machine Learning Repository," [online], [Retrieved Jan. 18, 2021]. Retrieved from Internet <URL:https://archive.ics.uci.edu/ml/index.php> 2017. (1pg).

European Search Report dated Sep. 23, 2021, in European Patent Application No. EP 20 21 5923, dated Oct. 4, 2021. (14 pgs).

Gauerhof et al., "Reverse Variational Autoencoder for Visual Attribute Manipulation and Anomaly Detection,", In 2020 IEEE Winter Conference on Applications of Computer Vision (WACV), 2020. (10pgs).

Zenati et al., "Adversarially Learned Anomaly Detection," 2018 IEEE International Conference on Data Mining (ICDM), 2018. (10pgs).

Kumar et al., "Maximum Entropy Generators for Energy-Based Models", arXiv preprint arXiv: 1901.08508, 2019. (10pgs).

Zhu et al.,"Unpaired Image-to-Image Translation Using Cycle-Consistent Adversarial Networks," arXiv preprint arXiv:1703.10593, 2018. (18pgs).

Zong et al.,"Deep Autoencoding Gaussian Mixture Model for Unsupervised Anomaly Detection," In 6th International Conference on Learning Representations (ICLR), 2018. (19pgs).

\* cited by examiner

1000

ESTIMATING THE IMPLICIT LIKELIHOODS OF GENERATIVE ADVERSARIAL NETWORKS

BACKGROUND

A. Technical Field

The present disclosure relates generally to systems and methods for computer learning that can provide improved computer performance, features, and uses. More particularly, the present disclosure relates to embodiments for estimating the implicit likelihoods of generative adversarial networks (GANs).

B. Background

Many real-world high dimensional data sets concentrate around low dimensional unknown manifolds. Deep models provide new approaches to estimate the density of extreme high dimensional data. Generative models, e.g., generative adversarial networks (GANs), can learn the distributions of high dimensional data sets and generate samples as well. GANs typically use the adversarial loss as their training objective, which penalizes dissimilarity between the distribution of the generated samples and the real samples. Given infinite approximation power, the original GAN objectives aim to minimize the Jensen-Shannon divergence between the real data distribution and generated samples.

The generator in a GAN can be seen as a nonlinear parametric mapping g: $\mathcal{Z} \rightarrow \mathcal{X}$ from the low dimensional latent space to the data manifold. With the realistic pictures generated with GANs, one can claim that a well regularized GAN model can approximate the true data manifolds well. With good data manifold approximations, people try to leverage the GANs to other tasks beyond image generation, e.g., anomaly detection, photo style transformation, and text generation.

Due to the broad applications of GANs, it is important to measure the distribution likelihoods of any given samples. However, GANs are implicit models, which means that the sample likelihoods cannot be computed directly. The discriminator used in the GAN is designed to classify the samples from true data distribution and the samples from the generator. Thus, the discriminator cannot estimate the likelihoods of the samples that do not belong to either of the distributions. It has been proven that there exists an inverse function of the generator that can project samples in the sample space into the latent space. An approach has been provided by Aditya Ramesh and Yann LeCun in "Backpropagation for Implicit Spectral Densities," *Technical Report* (2018) (available at arXiv.org/pdf/1806.00499.pdf) to estimate the spectral implicit density of generative models. However, this method does not provide a qualitative way to estimate the likelihood of any given samples.

Accordingly, what is needed are approaches that can learn an inverse function of the generator of GAN models that preserve the measurement consistence.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
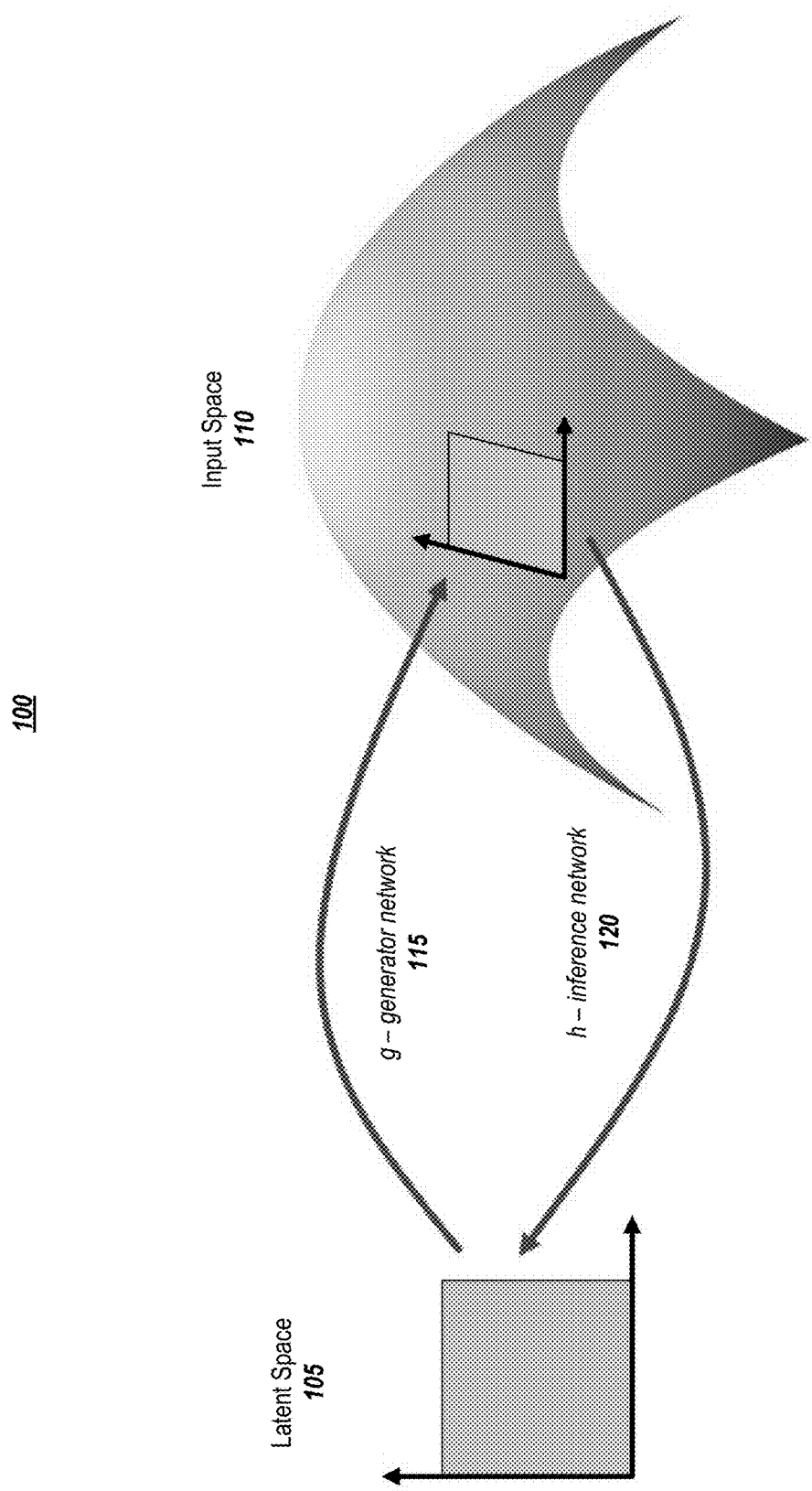
FIG. 1 graphically depicts learning an approximate inverse (inference) function of the generator network, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled"

shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state.

Any headings used herein are for organizational purposes only and shall not be used to limit the scope of the description or the claims. Each reference/document mentioned in this patent document is incorporated by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. GENERAL INTRODUCTION

Presented herein are embodiments of approaches that can learn an inverse function of the generator of GAN models that preserve the measurement consistence, and then apply the inverse function to data sample likelihood estimation. In the following sections, some manifold concepts for deep generative models are reviewed, and then neural network models for density estimation are introduced. Also presented is a short survey on the application of generative models to anomaly detection.

1. Deep Generative Models as Manifolds

Recently, people have tried to apply manifold analysis to generative models. For example, some have attempted to improve GAN-based semi-supervised learning by adding manifold invariant into the classifier. Others have tried to perform geodesic clustering with deep generative models. Yet others have added stochastic variables to the variational autoencoder (VAE) generator. With the variance network, the metric estimation on the data manifold can be improved. Mathematically, a deterministic generative model $x=g(z)$ may be seen as a surface model if the generator g is sufficiently smooth.

Provided herein is a brief review of some basic concepts on surfaces. A deep generative model represents an embedding function, $g: \mathcal{Z} \to X$, from a low-dimensional latent space $\mathcal{Z} \subseteq R^d$ to a submanifold $\mathcal{M} \subseteq R^D$. Usually, it is the case that $D \gg d$. g may be assumed as a smooth injective mapping, so that $\mathcal{M}$ is an embedded manifold. The Jacobian of g at $z \in \mathcal{Z}$, $J_g(z)$, provides a mapping from the tangent space at $z \in \mathcal{Z}$ into the tangent space at $x=g(z) \in X$, i.e., $J_g: T_z \mathcal{Z} \to T_x X$. This mapping is not surjective and the range of $J_g$ is restricted to the tangent space of the manifold $\mathcal{M}$ at $x=g(z)$, denoted as $T_x \mathcal{M}$. Since a GAN can generate realistic images, $\mathcal{M}$ is close to the true data manifold, namely $\mathcal{M}_{data}$.

The Riemannian metric may be represented as a symmetric, positive definite matrix field, M(z), defined at each point z on the latent coordinate space, $\mathcal{Z}$. M(z) may be given by the following formula:

$$M(z) = J_g(z)^T J_g(z).$$

Given two tangent vectors $u, v \in T_z \mathcal{Z}$ in coordinates, their inner product is defined as $\langle u, v \rangle = u^T M(z) v$. Consider a smooth curve $\gamma: [a, b] \to \mathcal{Z}$. This corresponds to a curve on the manifold, $g \circ \gamma(t) \in \mathcal{M}$. The arc length of $\gamma$ may be given by the following formula:

$$L(\gamma) = \int_a^b \sqrt{\dot\gamma(t)^T M_{\gamma(t)} \dot\gamma(t)} \, dt,$$

where $\dot\gamma(t)$ is the first order derivative of $\gamma$ at time t. For example, with the explicit formula of geodesic distance, one can then apply geodesic clustering on the data manifold.

2. Change of Variable

When $\dim(\mathcal{Z}) < \dim(X)$, the change of variable theorem is known in the context of geometric measure theory as the smooth coarea formula. With the assumption that g is a topological embedding from Z to the submanifold $\mathcal{M}$ of X. It says that:

$$p_X(x) = p\mathcal{Z}(g^{-1}(x)) \det(J_g(g^{-1}(x))^T J_g(g^{-1}(x)))^{-1/2},$$

where it is assumed that the prior distribution on the latent space $p\mathcal{Z}$ is $N(0, I_d)$ throughout this patent document. For $x \in \mathcal{M}$, $z = g^{-1}(x)$, and one obtains:

$$\log(p_X(g(z))) = \log(p\mathcal{Z}(z)) - \tfrac{1}{2} \log(\det(J_g(z)^T J_g(z))). \quad (1)$$

For a real-world data set, typically one would not know the true tangent space dimension number of $\mathcal{M}_{data}$ at a given data sample x. People usually set $d = \dim \mathcal{Z}$ larger than the $T_x \mathcal{M}_{data}$ for all x. This leads to the problem that $J_g$ does not have a full rank, and so does M(z). It means that it may be impossible to directly apply Eq. (1) with logarithm of zero determinant to estimate the sample density.

3. Density Estimation with Neural Networks

Along with the thriving of deep neural networks and GANs, a number of density estimation methods have been developed. The MADE model (Mathieu Germain, Karol Gregor, Iain Murray, and Hugo Larochelle, "MADE: Masked Autoencoder for Distribution Estimation," in *Proceedings of the* 32*nd International Conference on Machine Learning (ICML)*. Lille, France, 881-889 (2015)) was proposed to estimate the likelihood values with masked neural networks. RealNVP (Laurent Dinh, Jascha Sohl-Dickstein, and Samy Bengio, "Density estimation using Real NVP," in 5*th International Conference on Learning Representations (ICLR)*. Toulon, France (2017)) and Glow (Diederik P. Kingma and Prafulla Dhariwal, "Glow: Generative Flow with Invertible 1×1 Convolutions," in *Advances in Neural Information Processing Systems (NeurIPS)*. Montreal, Québec, Canada, 10236-10245 (2018)) are generative models that state that they can estimate samples' likelihood values.

Both RealNVP and Glow employ reversible neural networks with special Jacobian metric whose determinate can easily be calculated. Similar to RealNVP and Glow, FFJord (Will Grathwohl, Ricky T. Q. Chen, Jesse Bettencourt, Ilya Sutskever, and David Duvenaud, "FFJORD: Free-Form Continuous Dynamics for Scalable Reversible Generative Models," in 7*th International Conference on Learning Representations (ICLR)*. New Orleans, La. (2019)) is a generative model, which can yield sample likelihood values with free-form Jacobian reversible neural network. FlowGAN (Aditya Grover, Manik Dhar, and Stefano Ermon, "Flow-GAN: Combining Maximum Likelihood and Adversarial Learning in Generative Models," in *Proceedings of the Thirty-Second AAAI Conference on Artificial Intelligence (AAAI)*. New Orleans, La., 3069-3076. (2018)) estimates data distribution by combining maximum likelihood estimation (MLE) and adversarial loss. The combination of MLE and adversarial loss may reduce the quality of generated samples. Most of these models use flow models to avoid the singularity issues coming with GANs. However, using the same dimension number for both the latent space and the data space may violate the fact that most real-world data sets are following distributions on low dimensional manifolds. As discussed in previous subsections, GANs can approximate the real data distribution in a more reasonable approach. In this patent document, embodiments of methods are presented that can estimate the quantitative likelihood or density values of data samples by leveraging the manifold approximation power of GANs. Embodiments of the GAN likelihood estimation methodology presented herein may also be applied to anomaly detection, which (as shown herein) demonstrate their effectiveness as compared with existing anomaly detection methods. A review on anomaly detection with generative models is given in the next subsection.

4. Anomaly Detection with Generative Models

Generative models have been taken as effective ways to learn data representations and have been applied to anomaly detection. The auto-encoder based approaches first train a model that can reconstruct normal samples and then use the reconstruction errors to identify abnormal samples. Some approaches assume that the latent spaces of data sets follow Gaussian mixture distributions. Instead of utilizing auto-encoder based methods that derive statistical anomaly criterion in light of data distributions or energies, some have employed a GAN-based framework to detect abnormal medical images. In that approach, the latent variables of the samples were inferred with stochastic gradient descent. The anomaly score was estimated with the reconstruction error from the inferred latent variables in addition to the discrimination value from the discriminator of GAN model. Different from these existing methods, the new anomaly detection methodology embodiments herein are based on the proposed GAN likelihood estimation.

In summary, presented herein are embodiments of a framework that can estimate the log-likelihoods of samples by leveraging GAN models. The proposed method embodiments can approximate the local variance of any given data points with the help of two learned networks, the variance for the generator and the inference network for the latent representation. With the variance network, the singularity of the generator's Jacobian matrix can be avoided. Thus, in one or more embodiments, the likelihoods of samples can be calculated with the Riemannian metric. Experiments on several data sets reveal that, in the tasks of anomaly detection and likelihood testing, embodiments considerably outperform other baseline methods.

B. EMBODIMENTS

GANs attempt to estimate the empirical distributions of high dimensional data sets. Given the learned generator g, and a latent variable z, the generated sample g(z)'s log-likelihood may be estimated with Eq. (1). The computation of Eq. (1) implies the full rank of g's Jacobian matrix regarding z. One may use a low dimensional latent space, i.e., a small d, to obtain a full rank Jacobian matrix for almost any $z \in \mathcal{Z}$. However, experimentally a small d may hurt the performance of GANs. In this patent document, these issues are addressed with an alteration and extension of the classical GAN model. One goal herein is to estimate the likelihoods of any given data samples. An inference network should be learned to directly map a given data point x in the input space to a latent variable z that can be mapped back to a point close to x on the manifold $\mathcal{M}$. Then, the sample x's log-likelihood value may be computed thanks to the generator and the newly proposed variance network.

1. Variance Network of the Generator Embodiments

In one or more embodiments, a variance network a is added to the generator g, and it extends the generator to a stochastic one, $$f(z) = g(z) + \sigma(z) \odot \epsilon, \text{ and} \qquad (2)$$

$$g: \mathcal{Z} \to \mathcal{X}, \sigma: \mathcal{Z} \to \mathbb{R}_+^D, \epsilon \sim N(0, I_D).$$

Here g is the mean function, σ is the variance function, and ⊙ stands for element-wise multiplication. For a given ϵ, f is an approximation of g, and $\mathbb{E}_{\epsilon \sim N(0, I_D)} f(z) = g(z)$. The variance network a extends the generator g to the whole input space $\mathbb{R}^D$. It will be shown that the singularity issue of the g's Jacobian matrix can be overcome with its variance network σ. To ensure that the variances are large in the regions without or less data samples, σ may be formulated with a radial basis function (RBF) neural network (Qichao Que and Mikhail Belkin, "Back to the Future: Radial Basis Function Networks Revisited," in *Proceedings of the 19th International Conference on Artificial Intelligence and Statistics (AISTATS)*. Cadiz, Spain, 1375-1383 (2016)). The RBF network is a trainable kernel learning function.

Setup and training of variance network σ. In one or more embodiments, first of all, a large number of data points are sampled from the latent space $\mathcal{Z}$, and then these data points are divided into K clusters with K-means. $c_k$ is the center of cluster k and $C_k$ is the number of data points in cluster k. For any data sample x, to compute the corresponding variance values, the inference network h (which is introduced in the next subsection) is first used to estimate its latent variable, i.e., z=h(x). The RBF network returns the x's variance values by aggregating the distance from z to all the cluster centers with learned kernel weights. This step may be done in a prepossessing stage and it can avoid computation overhead to the main algorithm.

In one or more embodiments, the RBF function σ function is given by, $$\sigma(z) = \left(W^2 v(z)\right)^{-\frac{1}{2}},$$

$$v_k(z) = \exp\left(-\lambda_k \|z - c_k\|_2^2\right), k = 1, \ldots, K$$

$$\lambda_k = \frac{1}{2} \left(\frac{a}{|C_k|} \sum_{z_j \in C_k} \|z_j - c_k\|_2\right)^{-2},$$

where a is a hyper-parameter for the kernel, and W is the network parameter to be learned from training data samples.

The samples with larger distance from the cluster centers will have larger variances. In one or more embodiments, given a generator network g, the variance network weights W can be learned by minimizing the distance between f(z) and x. With the stochastic generator f and the variance function, the Riemannian metric may be written as:

$$\overline{M}_f^z = \mathbb{E}_{\epsilon \sim N(0, I_D)} J_f^T(z) J_f(z) = J_g^T(z) J_g(z) + J_\sigma^T(z) J_\sigma(z). \quad (3)$$

The following is a lemma for the estimation of likelihoods.

LEMMA 1. With K≥dim($\mathcal{Z}$)+1 and a full rank $W^2$, $\overline{M}_f^z$ is a full rank matrix. The log-likelihood of a generated sample may be given by:

$$\mathbb{E}_{\epsilon \sim N(0, I_D)} \log(p_x(f(z))) = \log(p_z(z)) - \frac{1}{2}\log(\det(\overline{M}_f^z)). \quad (4)$$

PROOF. We have $\frac{\partial}{\partial z}\sigma(z) = BW^2VE$, where $$B = \begin{bmatrix} -\frac{1}{2}\beta_1^{-\frac{3}{2}}(z) & & \\ & \ddots & \\ & & -\frac{1}{2}\beta_D^{-\frac{3}{2}}(z) \end{bmatrix},$$

$$E = \begin{bmatrix} z - c_1 \\ \ldots \\ z - c_K \end{bmatrix}$$

$$V = \begin{bmatrix} -2\lambda_1 e^{-\lambda_1 \|z - c_1\|_2^2} & & \\ & \ddots & \\ & & -2\lambda_K e^{-\lambda_K \|z - c_K\|_2^2} \end{bmatrix}.$$

Here $\beta_i(z) = W_{i,\cdot}^2 v(z)$. As rank(B)=D, rank(V)=K, rank(E)≥dim($\mathcal{Z}$), as B and V are diagonal and full rank, if $W^2$ is full rank, then rank($BW^2V$)=rank(W)=K. As the K centers are different from each other, rank(E)=dim($\mathcal{Z}$), then rank($J_\sigma$)=dim($\mathcal{Z}$), thus $M_z^{(f)}$ is positive-definite. We have:

$$\log(p_x(f(z))) = \log(p_z(z)) - \frac{1}{2}\log(\det(J_f^T(z)J_f(z))),$$

$$\mathbb{E}_{\epsilon \sim N(0, I_D)} \log(p_x(f(z))) =$$

$$\log(p_z(z)) - \mathbb{E}_{\epsilon \sim N(0, I_D)} \frac{1}{2}\log(\det(J_f^T(z)J_f(z))) = \log(p_z(z)) - \frac{1}{2}\log(\det(\overline{M}_f^z)).$$

The determinate of a d×d matrix, $\overline{M}_f^z$ will likely be either a too small or a too large value that is likely out of the precision of the computer system. This issue may be avoided by using the eigenvalues of $\overline{M}_f^z$ to estimate a sample's likelihood.

Remark: Note that $$\mathbb{E}_{\epsilon \sim N(0, I_D)} \log(p_X(f(z))) =$$

$$\log(p_z(z)) - \frac{1}{2}\log(\det(\overline{M}_f^z)) = \log(p_z(z)) - \frac{1}{2}\sum_{i=1}^{d}\log(\lambda_i).$$

Here $\Delta_i$, $0 \leq i \leq d$ are the eigenvalues of $\overline{M}_f^z$.

2. Inference Network Learning Embodiments

In one or more embodiments, for a given data sample x, the corresponding latent space representation z should be found before Eq. (3) and Eq. (4) are used to compute the Riemannian metric and thus the likelihood value. As shown in FIG. 1, a goal is to learn an approximate inverse of the generator network g 115, so that for z ∈ $\mathcal{Z}$, one has h: $\mathbb{E}_{\epsilon \sim N(0, I_D)} h(f(z)) = \mathbb{E}_{\epsilon \sim N(0, I_D)} h(g(z) + \sigma(z)\bigodot\epsilon) \approx z$.

The latent variable of a point x in the input space 110 may be approximated by the inference network (encoder) h 120. Given an E and a full rank $J_f$(z) at z and ∈, f is locally invertible in the open neighborhood f(S), S being an open neighborhood of z. A goal is to learn an h: f(S)→S such that $\mathbb{E}_{\epsilon \sim N(0, I_D)} h(f(z)) \approx z$, ∀z ∈ S.

With the variance network a introduced in the previous subsection, one can avoid the singularity of Riemannian metric of $\mathcal{M}$(z) as long as K≥dim($\mathcal{Z}$)+1. In one or more embodiments, the following empirical log-likelihoods of data samples from the data distribution $p_{data}$ are maximized to learn the parameters of σ and h, $$\max_{h,\sigma} \mathbb{E}_{x \sim p_{data}(x)} [\log(p(x|z))|_{z=h(x)}]. \quad (5)$$

Here (p(x|z)) is parametric with the extended generator f. According to Eq. (2), given a z, p(x|z) is a multivariate Gaussian distribution with mean g(z), and co-variance matrix $\Lambda_\sigma$, and $\Lambda_\sigma(z)$=diag(σ(z)). In one or more embodiments, a constraint is added to Eq. (5) to include the prior distribution of z into the objective, and it forces the posterior q(z|x) (z=h(x), x~$p_{data}$(x)) to be close to the prior of z, p(z) (p(z) is the $p_z$(z) in section A.2), $$\max_{h,\sigma} \mathbb{E}_{x \sim p_{data}(x), z=h(x)} [\log(p(x|z)) - KL(q(z|x) \| p(z))].$$

In one or more embodiments, each element of the empirical distribution q(z|x) is a Gaussian distribution with the sample average of h(x) as the mean, and the sample standard deviation of h(x), x~$p_{data}$(x) as the standard deviation. The objective formulae are different from a typical VAE model. In one or more embodiments, the variance of distribution q(z|x) is not modeled in order to reduce model complexity. Moreover, given the generator g, in one or more embodiments, an objective is to learn a variance network a for the generator g rather than the decoder in VAEs. It is easy to prove that, with z ∈ $\mathcal{Z}$, and ∈ ~N(0,$I_D$), f follows a Gaussian Process with g as the mean function, and $\Lambda_\sigma$ as the covariance function, and $\Lambda_\sigma$ is a diagonal matrix with a along the diagonal.

LEMMA 2. Assuming g is a well learned generator function with GAN model, with z ∈ $\mathcal{Z}$ and ∈ ~N(0,$I_D$), the stochastic generator f(z) = g(z) + σ(z)⊙∈ can be taken as $$f(z) \sim GP(g(z), \Lambda_\sigma).$$

PROOF. Any collection of the entries of f follows a Gaussian distribution. According to the definition of Gaussian process, f(z) follows Gaussian Process.

By stacking f and h together, it is a regression model to reconstruct a data sample x (x~$p_{data}$), i.e., x̂=g(h(x))+σ(h(x))⊙∈. With the inferred latent variables and a collection of reconstructed data samples x̂~f(h(x)), the whole framework may be considered in some respects similar to the Gaussian Process latent variable model (GP-LVM). The objective for h and a becomes:

$$L_{h,\sigma} = \mathbb{E}_{x \sim p_{data}} \left[ \sum_{i=1}^{D} \left[ -\frac{1}{2}(g_i(h(x)) - x_i)^2/\sigma_i^2(h(x)) - \log \sigma_i(h(x)) \right] - KL(q(z|x) \| p(z)) \right].$$

3. Stabilize Training Embodiments

Experimentally, it is rather difficult to learn a pair of perfect h and a for a given g. In one or more embodiments, the learning of both networks is integrated with the training of GANs. In one or more embodiments, the following objective may be used to adjust the generator g and h:

$$\min_{g,h} \mathbb{E}_{z \sim p(z)} \left[ \| z - h(g(z)) \|^2 \right].$$

It may be considered similar to the regularization term in InfoGAN that enforces mutual information between the generated samples and partial latent variables. VEEGAN also included a similar term to their regularization to reduce model collapses. Experiments show that with this term the model can converge fast and the training process is more stable. As noted previously, FIG. 1 shows the scheme of the g and h, in which the generator network 115 maps from the latent space 105 to the input space 110 and the inference network 120 maps to the latent space 105.

4. System Embodiments

Figure 2:
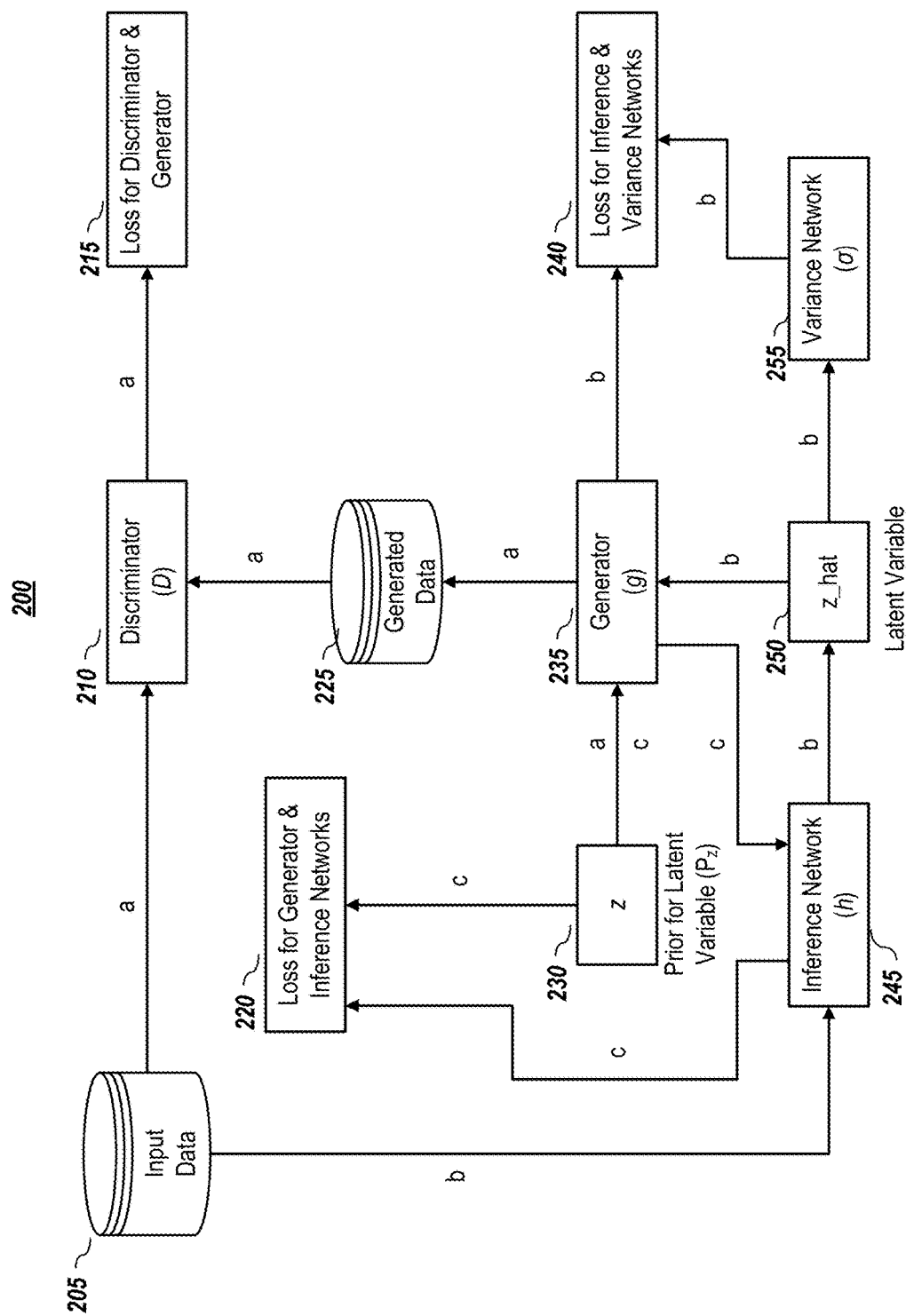
FIG. 2 depicts an examples system architecture for training, according to embodiments of the present invention.

FIG. 2 depicts a system architecture 200, according to embodiments of the present invention. As depicted, the overall system 200 comprises four main networks: a discriminator network 210, a generator network 235, an inference network 245, and a variance network 255. In one or more embodiments, the discriminator network 210 receives as input samples from an input data set 205, which may be, for example, real image or other types of data, and generated data 225, which is generated by the generator network 235. In one or more embodiments, the generator network 235 receives as inputs data from a prior for the latent variable (z) 230 and latent variables ($\hat{z}$) 250. In one or more embodiments, the inference network 245 receives as inputs data from the input data set 205 and data from the generator network 235, and outputs the latent variables ($\hat{z}$) 250 and data for loss computation 220. The variance network 255 receives latent variables 250 from the inference network 245 and provides output to compute losses for the interference and variance networks 240.

In FIG. 2, the paths are labeled with a, b, and/or c, which indicate paths for losses. Paths labeled with "a" are related to loss for the discriminator and generator networks. Paths labeled with "b" are related to loss for the inference and variance networks. And, paths labeled with "c" are related to loss for the inference and generator networks.

The following section sets for methodology embodiments for training such a system.

5. Methodology Embodiments

In one or more embodiments, a methodology to learn the inference network h and the variance network a may be combined with the learning of the generator network g and the discriminator network d in a GAN. An embodiment of a training procedure is given in Methodology 1 (below).

---

Methodology 1: The following methodology may be used to learn a GAN with an inference network h and a variance network σ

---

Input: Data sample set
Output: Networks g, d, h, and σ
Sample a fixed number of hidden variables from $P_z$ for K-means clustering;
Compute $\lambda_k$, $c_k$, k = 1, ..., K;
while Training not finished do
  Sample minibatch m samples $\{x^{(1)}, \ldots, x^{(m)}\}$ from $P_{data}$;
  Sample minibatch m samples $\{z^{(1)}, \ldots, z^{(m)}\}$ from noise prior $P_z$;
  Updating the discriminator d with ascending the gradient $$\nabla_{\theta_d} \frac{1}{m} \sum_{i=1}^{m} [\log d(x^{(i)})] + \log(1 - d(g(z^{(i)})))].$$

Sample minibatch m samples $\{z^{(1)}, \ldots, z^{(m)}\}$ from noise prior $P_z$;
  Updating the generator g by descending the gradient $$\nabla_{\theta_g} \frac{1}{m} \sum_{i=1}^{m} [\log(1 - d(g(z^{(i)})))].$$

Sample minibatch m samples $\{x^{(1)}, \ldots, x^{(m)}\}$ from $P_{data}$;
  Updating h and σ by ascending the gradient $\nabla_{\theta_{h,\sigma}} L_{h,\sigma}$;
  Sample minibatch m samples $\{z^{(1)}, \ldots, z^{(m)}\}$ from noise prior $P_z$;
  Updating h and g by descending the gradient $$\nabla_{\theta_{h,g}} \frac{1}{m} \sum_{i=1}^{m} \| z^{(i)} - h(g(z^{(i)})) \|^2.$$

end while

---

Figure 3A:
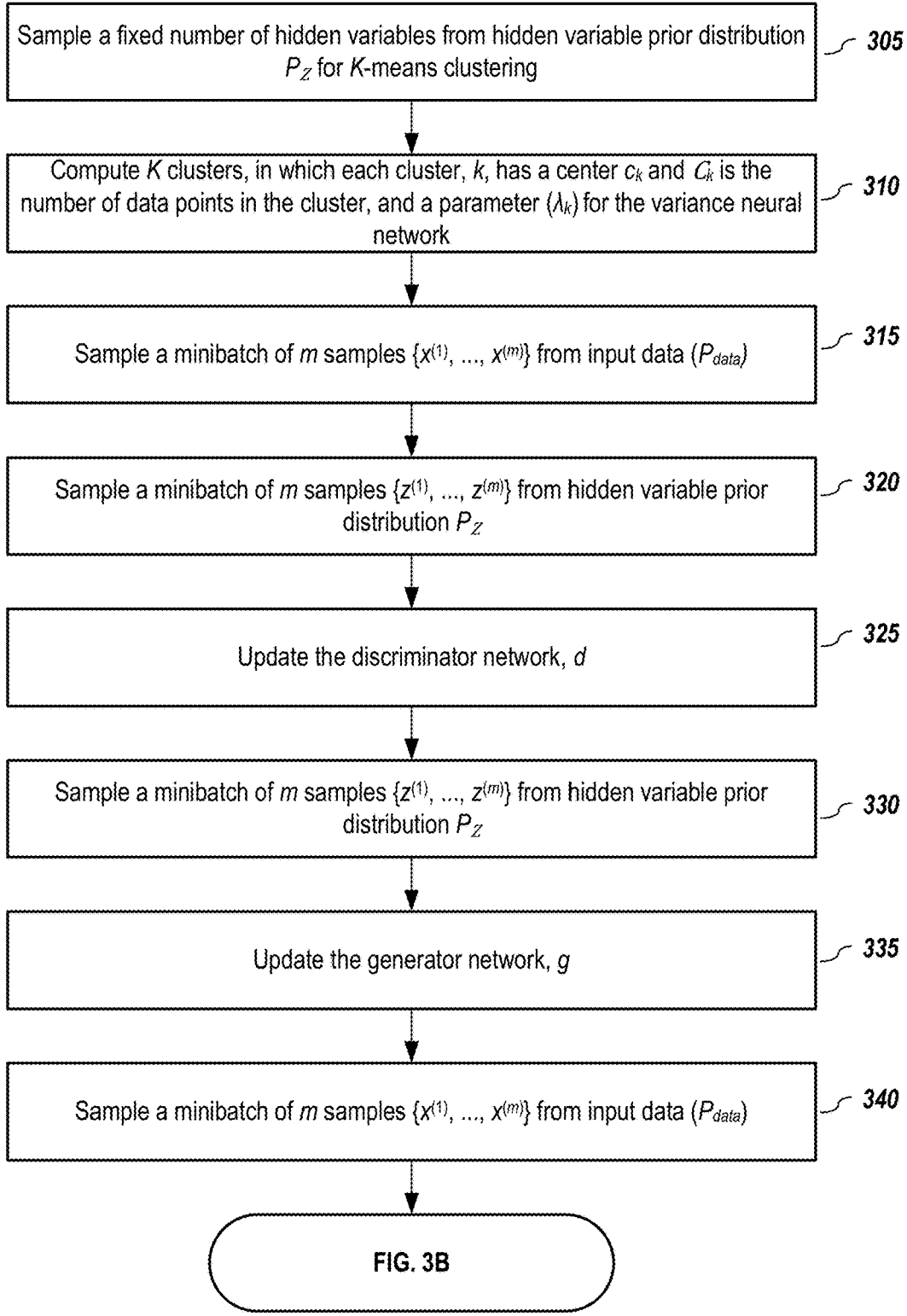
FIGS. 3A and 3B depict a methodology for training, according to embodiments of the present disclosure.
Figure 3B:
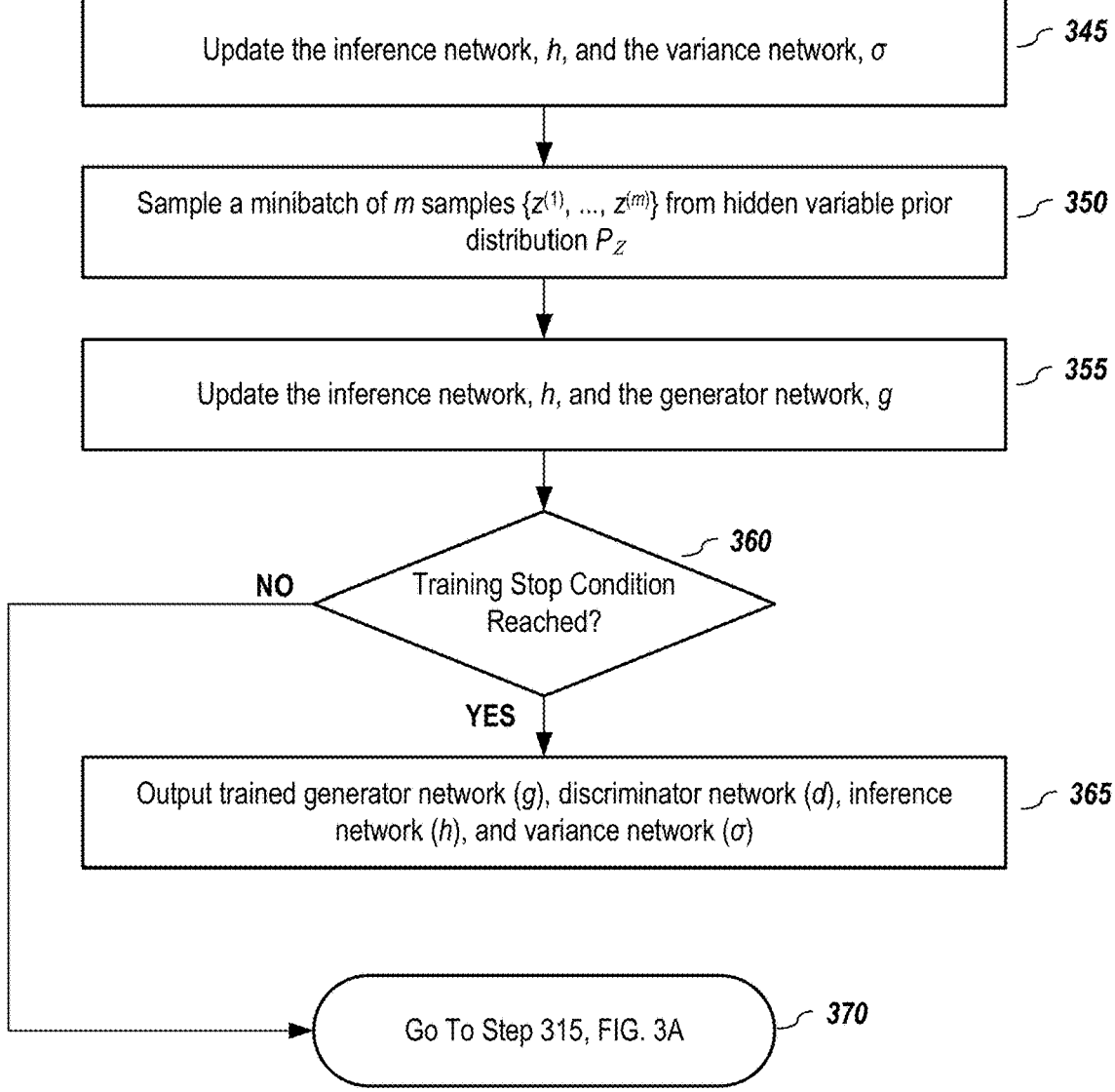

FIGS. 3A and 3B depicts a methodology for training, according to embodiments of the present disclosure. In one or more embodiments, a fixed number of hidden variables are sampled (305) from a hidden variable prior p $\mathcal{Z}$ for K-means clustering. For these samples, K clusters are computed (310), in which each cluster, k, has a center $c_k$, a number of data points in the cluster ($C_k$), and a parameter ($\lambda_k$) (see Section B.1.) for the variance neural network.

In one or more embodiments, a minibatch of m samples $\{x^{(1)}, \ldots, x^{(m)}\}$ is obtained by sampling (315) from input data (e. g., $P_{data}$), and a minibatch of m samples $\{z^{(1)}, \ldots, z^{(m)}\}$ is obtained by sampling (320) from a hidden variable prior (e.g., P $\mathcal{Z}$). Using that training data, the discriminator network is updated (325).

In one or more embodiments, a minibatch of m samples $\{z^{(1)}, \ldots, z^{(m)}\}$ is obtained by sampling (330) from a hidden variable prior (e.g., P $\mathcal{Z}$). Using the data, the generator network is updated (335).

In one or more embodiments, a minibatch of m samples $\{x^{(1)}, \ldots, x^{(m)}\}$ is obtained by sampling (340) from input data (e. g., $P_{data}$). Using the data, the inference network, h, and the variance network, a, are updated (345).

In one or more embodiments, a minibatch of m samples $\{z^{(1)}, \ldots, z^{(m)}\}$ is obtained by sampling from the hidden variable prior. Using the data, the inference network and the generator network are updated (355).

If a stop condition has not been reached (360), the process returns (370) to step 315. In one or more embodiments, a stop condition may include: (1) a set number of iterations have been performed; (2) an amount of processing time has been reached; (3) convergence (e.g., the difference in a loss or losses (or a gradient or gradients) between consecutive iterations are less than a threshold value; (4) divergence (e.g., the performance begins to deteriorate); and (5) an acceptable loss or losses have been reached.

If a stop condition has been reached (360), the trained networks may be output (e.g, the generator network (g), the discriminator network (d), the inference network (h), and the variance network (a)).

Let $W^t$ denote W at iteration t in Methodology 1. Lemma 3 regards the updating steps for W. Lemma 3 shows that with a randomly initialized W, it may almost be ensured that each $W^t$, t=1, . . . , T is with full rank, and thus a full rank Jacobian matrix for the stochastic generator f. This means one may safely compute the likelihood values for almost any testing samples. Methodology 1 also avoids the step to directly fit the parameters of generator g with real data samples, and thus can preserve the capability of GAN to generate sharp and realistic images or data samples.

LEMMA 3. Let $W^t$ be the matrix W at the updating step t of Methodology 1, then $W^{t+1}$ will be the element-wise multiplication of $W^t$ with another matrix.

PROOF. Given a sample x, the latent variable is z=h(x). The loss regarding x, $$L_{h,\sigma}^x = \sum_{i=1}^{D} \left[ -\frac{1}{2}(g_i(h(x)) - x_i)^2/\sigma_i^2(h(x)) - \log\sigma_i(h(x)) \right] - KL(q(z|x)\|p(z)).$$

For the ith entry of x, the gradient regarding W is $$\frac{\partial L_{h,\sigma}^{x_i}}{\partial W} = -\left( \frac{(g_i(h(x)) - x_i)^2}{\sigma_i^3(h(x))} - \frac{1}{\sigma_i(h(x))} \right) \beta_i^{-\frac{3}{2}} W_i \cdot \odot v^T(z).$$

Here $\beta_i(z) = W_{i\cdot}^2 v(z)$. Let $$u_i(x) = \frac{\beta_i^{-\frac{3}{2}}}{\sigma_i(h(x))} \left( 1 - \frac{(g_i(h(x)) - x_i)^2}{\sigma_i^3(h(x))} \right),$$

one obtains $$\frac{\partial L_{h,\sigma}}{\partial W} = W \odot (u(x) v^T(z)).$$

Here $u(x) = [u_1(x), \ldots, u_D(x)]^T$.

Without losing the generality, in one or more embodiments, one may ignore the learning rate. For t, one obtains $$W^t = W^{t-1} + W^{t-1} \odot (u^{t-1}(x)(v^{t-1}(z))^T) = W^{t-1} \odot (1 + u^{t-1}(x)(v^{t-1}(z))^T).$$

With a batch of training samples $\mathcal{B}$, $W^t$ will be the element-wise product of $W^{t-1}$ with an aggregated updating matrix, which is $$W^t = W^{t-1} \odot \left( 1 + \frac{1}{|\mathcal{B}|} \sum_{x \in \mathcal{B}, z=h(x)} u^{t-1}(x)(v^{t-1}(z))^T \right).$$

This concludes the lemma.

Let $W^0$ be the initial value of W, the final step $W^T$ will be the element-wise multiplication of $W^0$ with the aggregated updating matrix regarding all steps. One may almost be sure about the full rank of $W^T$ as $W^0$ is randomly initialized and the updating matrix is almost with full rank due to the randomness of training samples. The time-consuming part may be the computation of the likelihood in the testing stage, which is due to the calculation of $J_g$, and g is a mapping from dim($\mathcal{Z}$) to dim(X).

C. THEORETICAL ANALYSIS

Methodology 1 basically follows the same procedure to learn the generator g and the discriminator d in GANs. In one or more embodiments, the only interaction between g and h is to enhance the mutual information between latent variables and the generated samples. The loss functions for d and g may be adapted to any other forms of divergence to measure distribution distances, such as Wasserstein distance. Without loss generality, presented herein is a study of the theoretical upper bound of distribution estimation with the approach presented in this patent document. Existing approaches may be followed to analysis the estimation upper bound. The definition of Earth Moving Distance, or equivalently Wasserstein-1 distance may be adopted.

DEFINITION 1. For distributions $\mathbb{P}$ and $\mathbb{Q}$ on $\mathbb{R}^d$, Wasserstein-1 distance between them $$W(\mathbb{P}, \mathbb{Q}) = \inf_{\gamma \in \Gamma(\mathbb{P}, \mathbb{Q})} \mathbb{E}_{(X,Y) \sim \gamma}[\|X - Y\|].$$

In the following theorems, $\mathbb{P}^{(n)}$ denotes the empirical distributions of $\mathbb{P}$ with n samples. In other words, suppose $x_i$, i=1, n are independent and identically distributed (i.i.d.) samples of $\mathbb{P}$, then $$\mathbb{P}^{(n)} = \frac{1}{n} \sum_{i=1}^{n} 1\{x = x_i\}$$

is a empirical distribution of $\mathbb{P}^{(n)}$. For distributions $\mathbb{P}$ and $\mathbb{Q}$, $\mathbb{P} + \mathbb{Q}$ denotes the distribution of X+Y for X~$\mathbb{P}$ and Y~$\mathbb{Q}$ independently. Suppose $$\mathbb{Q}^{(n)} = \frac{1}{n} \sum_{i=1}^{n} 1\{y = y_i\}$$

is an empirical distribution of $\mathbb{Q}^{(n)}$, then $$\mathbb{P}^{(n)} + \mathbb{Q}^{(n)} = \frac{1}{n} \sum_{i=1}^{n} 1\{z = x_i + y_i\}$$

is an empirical distribution of $\mathbb{P} + \mathbb{Q}$. It is worth noting that $$\mathbb{P}^{(n)} + \mathbb{Q}^{(n)} \neq \frac{1}{n^2} \sum_{i=1}^{n} \sum_{j=1}^{n} 1\{z = x_i + y_j\}.$$

THEOREM 1. Let $\mathcal{F}$ be certain function class and g: $\mathbb{R}^d \to \mathbb{R}^D$ be an L-Lipschitz function for D>d>2. Let Z be random variable satisfying $\mathbb{E}[\|Z\|^2] \leq c$ and $\mathbb{P}_1$ be the distribution of g(Z). Let $\mathbb{P}^{(n)}$ be an n-sample empirical distribution of g(Z)+$\epsilon$, where Z follows distribution such that $\mathbb{E}[\|Z\|^2] \leq \alpha$ and $\epsilon \sim N(0, \text{diag}(\sigma_1, \ldots, \sigma_D)/\sqrt{D})$, and $$\hat{g} = \arg\min_{\bar{g}\in\mathcal{F}, \bar{g}(Z)\sim\hat{\mathbb{P}}} W(\hat{\mathbb{P}}, \mathbb{P}^{(n)}).$$

Let $\hat{\mathbb{P}}$ be the distribution of $\hat{g}(Z)$, then $$\mathbb{E}[W(\hat{\mathbb{P}}, \mathbb{P}_1)] \leq 2C_d\sqrt{c}\,Ln^{-d} + 5\sqrt{\frac{\sum_{i=1}^D \sigma_i^2}{D}}$$

for the constant $C_d$ only depending on d from Theorem 2.

PROOF. Let $\mathbb{P}$, $\mathbb{P}_1$ and $\hat{\mathbb{P}}$ be the distribution of $g(Z)+\epsilon$, $g(Z)$, and $\hat{g}(Z)$ respectively. By triangle inequality, $$W(\hat{\mathbb{P}}, \mathbb{P}_1) \leq W(\hat{\mathbb{P}}, \mathbb{P}^{(n)}) + W(\mathbb{P}^{(n)}, \mathbb{P}) + W(\mathbb{P}, \mathbb{P}_1).$$

The first term on the RHS can be bounded by $$W(\hat{\mathbb{P}}, \mathbb{P}^{(n)}) = \min_{\bar{g}\in\mathcal{F}, \bar{g}(Z)\sim\hat{\mathbb{P}}} W(\hat{\mathbb{P}}, \mathbb{P}^{(n)}) \leq W(\mathbb{P}, \mathbb{P}^{(n)}),$$

where the inequality is due to the fact that $g \in \mathcal{F}$ and $g(Z) \sim \mathbb{P}$. Hence, one obtains $$W(\hat{\mathbb{P}}, \mathbb{P}_1) \leq 2W(\mathbb{P}^{(n)}, \mathbb{P}) + W(\mathbb{P}, \mathbb{P}_1).$$

It is sufficient to bound these two terms to obtain the desired result. $\mathbb{P}^{(n)} = \mathbb{P}_1^{(n)} + \mathbb{P}_2^{(n)}$ is decomposed, where $\mathbb{P}_1^{(n)}$ and $\mathbb{P}_2^{(n)}$ are n-sample empirical distribution of $g(Z)$ and $\epsilon$, respectively. Recall the assumption that $\epsilon \sim N(0, \text{diag}(\sigma_1, \ldots, \sigma_D)\sqrt{D}) = \mathbb{P}_2$.

$$W(\mathbb{P}^{(n)}, \mathbb{P}) \leq W(\mathbb{P}, \mathbb{P}_1) + W(\mathbb{P}_1, \mathbb{P}_1^{(n)}) + W(\mathbb{P}_1^{(n)}, \mathbb{P}^{(n)}).$$

By Lemma 4 and Jensen's inequality, one obtains $$W(\mathbb{P}, \mathbb{P}_1) = W(\mathbb{P}_1 + \mathbb{P}_2, \mathbb{P}_1)$$
$$\leq \mathbb{E}_{\epsilon\sim\mathbb{P}_2}[\|\epsilon\|] \leq (E_{\epsilon\sim\mathbb{P}_2}[\|\epsilon\|^2])^{1/2} \leq \sqrt{\frac{\sum_{i=1}^D \sigma_i^2}{D}}.$$

Since g is an L-Lipschitz function, let $Z \in \mathbb{Q}$ and $\mathbb{Q}^{(n)}$ be n-sample empirical distribution of Z. Suppose $$\hat{\mathbb{Q}}^{(n)} = \frac{1}{n}\sum_{i=1}^n 1\{z = z_i\} \text{ and } \mathbb{P}_n = \frac{1}{n}\sum_{i=1}^n 1\{x = g(z_i)\}.$$

Since g is an L-Lipschitz function, one obtains $$W(\mathbb{P}_1, \mathbb{P}_1^{(n)}) = \inf_{\gamma\in\prod(\mathbb{P}_1,\mathbb{P}_1^{(n)})} \mathbb{E}_{(X,Y)\sim\gamma}[\|X - Y\|]$$
$$\leq \inf_{\gamma\in\prod(\hat{\mathbb{Q}},\mathbb{Q}^{(n)})} \mathbb{E}_{(X,Y)\sim\gamma}[\|g(X) - g(Y)\|]$$
$$\leq \inf_{\gamma\in\prod(\hat{\mathbb{Q}},\mathbb{Q}^{(n)})} \mathbb{E}_{(X,Y)\sim\gamma}[L\|X - Y\|]$$
$$\leq LW(\hat{\mathbb{Q}}, \mathbb{Q}^{(n)}).$$

By Theorem 2, we have $$W(\mathbb{P}_1, \mathbb{P}_1^{(n)}) \leq LW(\mathbb{Q}, \mathbb{Q}^{(n)}) \leq C_d L\sqrt{c}n^{-d}.$$

By LEMMA (5), $$\mathbb{E}[W(\mathbb{P}_1^{(n)}, \mathbb{P}^{(n)})] = \mathbb{E}[w(\mathbb{P}_1^{(n)}, \mathbb{P}_1^{(n)} + \mathbb{P}_2^{(n)})]$$
$$\leq \mathbb{E}_{X\sim\mathbb{P}_2}[\|X\|] \leq \sqrt{\frac{\sum_{i=1}^D \sigma_i^2}{D}}.$$

Combining these bounds, one obtains $$\mathbb{E}[W(\mathbb{P}^{(n)}, \mathbb{P}_1)] \leq 3W(\mathbb{P}, \mathbb{P}_1) + 2\mathbb{E}[W(\mathbb{P}_1, \mathbb{P}_1^{(n)})] + 2\mathbb{E}[W(\mathbb{P}_1^{(n)}, \mathbb{P}^{(n)})]$$
$$\leq 3\sqrt{\frac{\sum_{i=1}^D \sigma_i^2}{D}} + 2C_d L\sqrt{c}n^{-d} + 2\sqrt{\frac{\sum_{i=1}^D \sigma_i^2}{D}}$$
$$= 2C_d L\sqrt{c}n^{-d} + 5\sqrt{\frac{\sum_{i=1}^D \sigma_i^2}{D}},$$

as desired.

LEMMA 4. Let $\mathbb{P}_1$, $\mathbb{P}_2$ and $\mathbb{Q}$ be distributions on $\mathbb{R}^d$, then $$W(\mathbb{P}_1 + \mathbb{P}_2, \mathbb{Q}) \leq W(\mathbb{P}_1, \mathbb{Q}) + \mathbb{E}_{X\sim\mathbb{P}_2}[\|X\|]$$

PROOF. Let $\gamma$ be the optimal joint distribution for the infimum of $W(\mathbb{P}_1, \mathbb{Q})$. It is noted that $\gamma$ does not necessarily exists in general. However, for every $\delta > 0$, there exists $\gamma_\delta \in \Pi(\mathbb{P}_1, \mathbb{Q})$ such that:
$$W(\mathbb{P}_1, \mathbb{Q}) + \delta \geq \mathbb{E}_{(X,Y)\sim\gamma_\delta}[\|X-Y\|].$$

Hence the argument can always be reduced to the case the optimal gamma exists. Hence, without loss of generality, it may be assumed that $\gamma$ exists. Let $\gamma'$ be the joint distribution of (X, Y) such that $Y \sim \mathbb{Q}$ and $X|Y \sim \gamma(\cdot, Y) + \mathbb{P}_2$. Then $\gamma' \in \Pi(\mathbb{P}_1 + \mathbb{P}_2, \mathbb{Q})$.

$$W(\mathbb{P}_1 + \mathbb{P}_2, \mathbb{Q}) \leq \mathbb{E}_{(X,Y)\sim\gamma'}[\|X - Y\|]$$
$$= \mathbb{E}_{(X,Y)\sim\gamma, Z\sim\mathbb{P}_2}[\|X + Z - Y\|]$$
$$\leq \mathbb{E}_{(X,Y)\sim\gamma, Z\sim\mathbb{P}_2}[\|X - Y\| + \|Z\|]$$
$$= \mathbb{E}_{(X,Y)\sim\gamma}[\|X - Y\|] + \mathbb{E}_{Z\sim\mathbb{P}_2}[\|Z\|]$$
$$= W(\mathbb{P}_1, \mathbb{Q}) + \mathbb{E}_{Z\sim\mathbb{P}_2}[\|Z\|],$$

as desired.

LEMMA 5. Let $\mathbb{P}$ and $\mathbb{Q}$ be distributions on $\mathbb{R}^d$. Let $\mathbb{P}^{(n)}$ and $\mathbb{Q}^{(n)}$ be the empirical distribution of $\mathbb{P}$ and $\mathbb{Q}$, respectively. Then:
$$\mathbb{E}_{[W(\mathbb{P}^{(n)}, \mathbb{P}^{(n)} + \mathbb{Q}^{(n)})]} \leq \mathbb{E}_{X\sim\mathbb{Q}}[\|X\|].$$

PROOF. Use the definition $$\mathbb{P}^{(n)} = \frac{1}{n}\sum_{i=1}^n 1\{x = x_i\}, \mathbb{Q}^{(n)} = \frac{1}{n}\sum_{i=1}^n 1\{y = y_i\} \text{ and}$$
$$\mathbb{P}^{(n)} + \mathbb{Q}^{(n)} = \frac{1}{n}\sum_{i=1}^n 1\{z = x_i + y_i\}. \text{ Let } \gamma \in \prod(\mathbb{P}^{(n)}, \mathbb{P}^{(n)} + \mathbb{Q}^{(n)})$$

such that if $(X, Y) \sim \gamma$, then $\mathbb{P}(Y = x_i + y_i | X = x_i) = 1$. Then:

$$W(\mathbb{P}^{(n)}, \mathbb{P}^{(n)} + \mathbb{Q}^{(n)})$$
$$\leq \mathbb{E}_{(X,Y)\sim\gamma}[\|X - Y\|]$$

$$\leq \frac{1}{n}\sum_{i=1}^{n}[\|x_i - (x_i + y_i)\|] = \frac{1}{n}\sum_{i=1}^{n}[\|y_i\|]$$

One obtains $$\frac{1}{n}\sum_{i=1}^{n}[\|y_i\|] = \mathbb{E}_{X\sim\mathbb{Q}}[\|X\|]$$

as desired.

Introduced is a theorem from Nicolas Fournier and Arnaud Guillin, "On the rate of convergence in Wasserstein distance of the empirical measure," *Probability Theory and Related Fields* 162,3-4 (2015), 707-738, which provides the bound between empirical distribution and original distribution in Wasserstein distance.

THEOREM 2 (THEOREM 1 in the Fournier and Guillin document referenced above) Let $\mathbb{P}$ be distribution on $\mathbb{R}^d$ and $\mathbb{P}_n$ be its n-sample empirical distribution. Suppose $\mathbb{E}_{X\sim\mathbb{P}}[\|X\|^2] \leq c$, then $$\mathbb{E}_{[W(\mathbb{P},\mathbb{P}_n)]} \leq C_d L \sqrt{c} n^{-d},$$

for some constant $C_d$ only depending on d.

D. EXPERIMENTS

It shall be noted that these experiments and results are provided by way of illustration and were performed under specific conditions using a specific embodiment or embodiments; accordingly, neither these experiments nor their results shall be used to limit the scope of the disclosure of the current patent document.

In this section, an embodiment of the likelihood estimation methodology is first evaluated with various data sets. Then, an embodiment of the methodology is applied to anomaly detection tasks. In the following experiments, "InvGAN" is used to represent an embodiment or embodiments of the present patent document. The implementation of the InvGAN embodiment or embodiments used in testing were based on the PaddlePaddle platform.

1. Likelihood Estimation on Synthetic Data

In this subsection, an embodiment is investigated using simulated data. There are two independent and identically distributed (iid) latent variables $z_1$, $z_2$ following N(0,1) distribution. The samples are simulated with X=[$w_1$ sin $z_1$, $w_2$ cos $z_2$, $w_3$ $z_1^2$, $w_4 z_2$, $w_5$ $z_1^3$, $w_6(z_1+z_2^2)$]+$\epsilon$, and each entry of E follows N(0,0.01). The Jacobian regarding X and z can be easily computed to obtain the ground truth likelihood value for each simulated data sample with Eq. (4). The simulated data set contents 50,000 samples for training and 50,000 samples for testing. In the tested embodiments, the generator and the discriminator both have two fully connected layers with 30 hidden nodes, and the invert function h has the same structure as the discriminator except the output dimension.

A tested embodiment model was compared with two density estimation models FlowGAN, and FlowVAE. FlowGAN is a hybrid model with maximum likelihood estimation (MLE) and adversarial loss. They employ coupling layers (as proposed in Laurent Dinh, Jascha Sohl-Dickstein, and Samy Bengio, "Density estimation using Real NVP," in *5th International Conference on Learning Representations (ICLR)*, Toulon, France (2017)) for the generator. With the coupling layers, the generator has the same number of dimensions for both latent space and input space. With the coupling layers, the determinate of the generator can be easily computed, and thus the likelihood of the samples. FlowGAN trains the generator based on both MLE and the adversarial the loss functions. A FlowVAE model was built with the decoder that had the same structure as the generator in the FlowGAN model. The InvGAN embodiment and the FlowGAN model had the sample structure for the discriminator, which includes four linear layers and three Relu layers. The same batch size and epoch number was used to train the three models.

Figure 4:
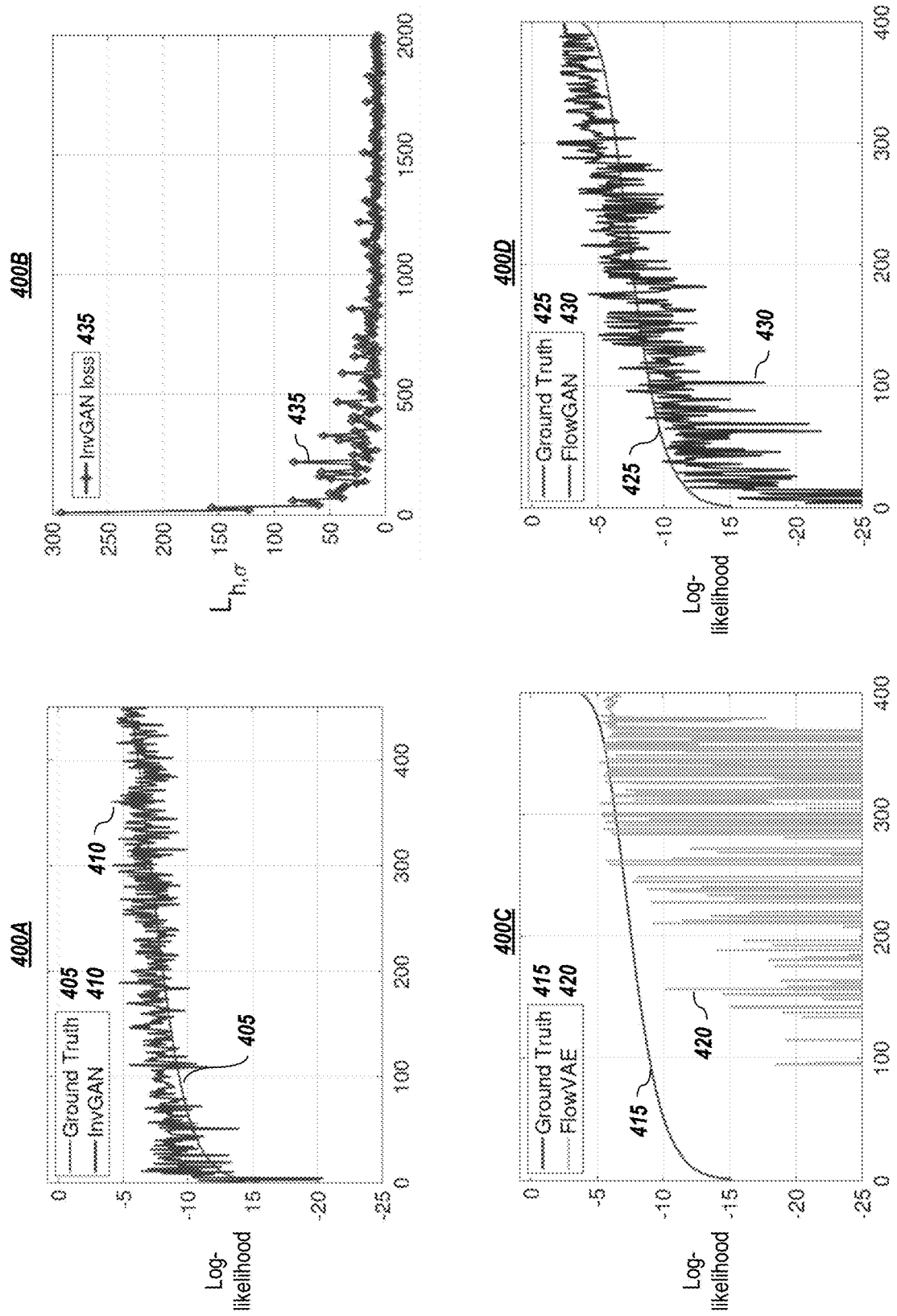
FIG. 4 gives the comparison between the ground truth and the estimated likelihood values for the testing set with three methods, according to embodiments of the present disclosure.

As stated previously, the data set was simulated with 2 latent variables, and the dimension of the input (sample) space was 6. Since FlowGAN and FlowVAE use the same dimension number for both input space and the latent space, this may result in a constant offset between the model estimations and the ground truth likelihood. To fairly compare different models in figures, a constant value was added to the likelihood values of both FlowGAN and FlowVAE. FIG. 4 gives the comparison between the ground truth and the estimated likelihood values for the testing set with three methods, according to embodiments of the present disclosure.

As shown in FIG. 4, the upper left plot 400A shows the InvGAN embodiment log-likelihoods of the simulated testing set; the upper right plot 400B presents the objective loss values over iterations; the lower two plots (400C and 400D) give the log-likelihood values of the simulated data set using FlowVAE and FlowGAN. For plots with log-likelihood values, the Y-axis is the log-likelihood value, and the X-axis is sample index based on the increasing order of the ground truth log-likelihood value. It can be seen that compared with FlowGAN and FlowVAE, the tested embodiment can give more smooth estimations for the likelihood values, and improved fitting with the ground truth likelihood curve.

2. Likelihood Estimation on Real Data Sets

Figure 5:
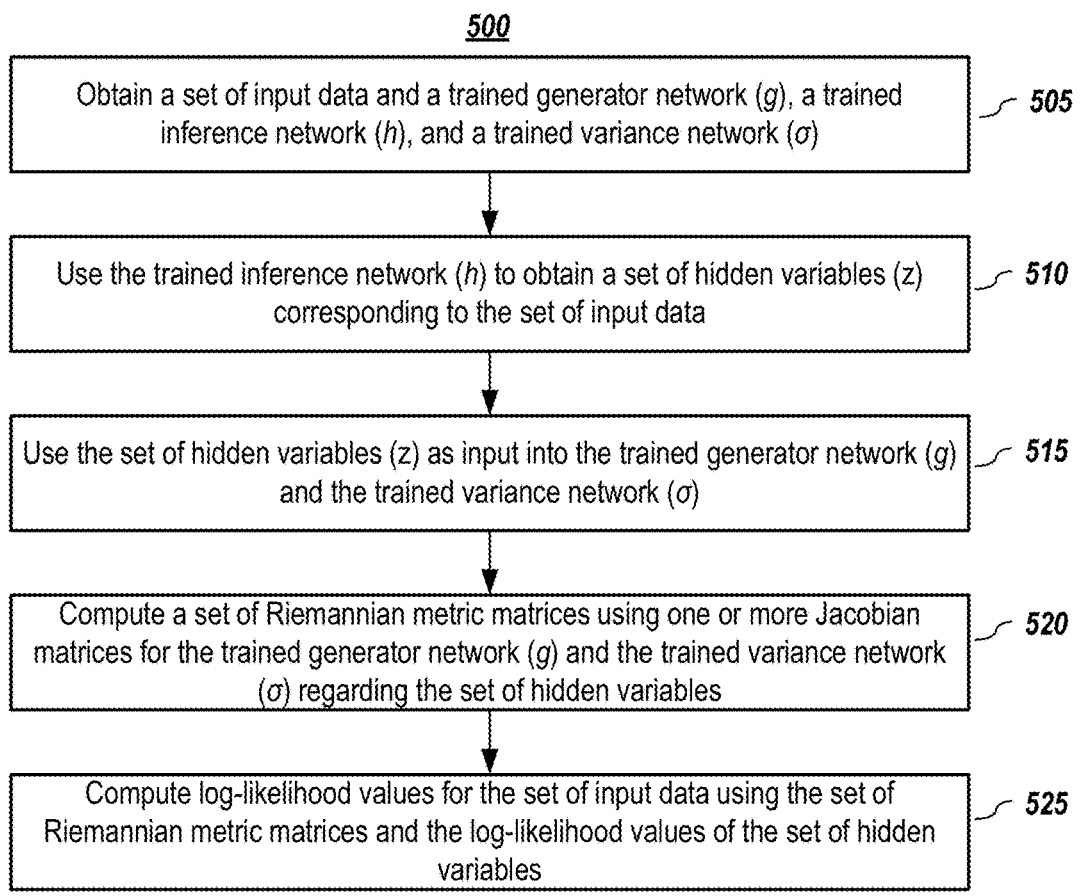
FIG. 5 depicts a method for likelihood estimation, according to embodiments of the present disclosure.

FIG. 5 depicts a method for likelihood estimation, according to embodiments of the present disclosure. The depicted method uses (505) a set of input data and three trained networks—a trained generator network (g), a trained inference network (h), and trained variance network (a). In one or more embodiments, the trained inference network (h) is used to obtain (510) a set of hidden variables (z) corresponding to the set of input data. The set of hidden variables are input (515) into the trained generator network (g) and the trained variance network (a). A set of Riemannian metric matrices may then be computed (520) using a Jacobian matrix or matrices for the trained generator network (g) and the trained variance network (a) regarding the set of hidden variables. Finally, log-likelihood values for the set of input data may be computed (525) using the set of Riemannian metric matrices and the log-likelihood values of the set of hidden variables.

TABLE 1

Bits/dim on testing data sets for different models; lower is better

| Model | Data Set 1 | Data Set 2 | Data Set 3 |
|---|---|---|---|
| RealNVP | 1.06 | 3.49 | 4.28 |
| Glow | 1.05 | 3.35 | 4.09 |
| FFJORD | 0.99 | 3.40 | — |
| MADE | 2.04 | 5.67 | — |
| MAF | 1.89 | 4.31 | — |
| FlowGAN | 3.26 | 4.21 | — |
| InvGAN | 1.29 | 1.23 | 1.02 |

The tested embodiment was compared with the other likelihood estimation methods using three data sets. The methods listed in the Table 1 include RealNVP, Glow, FFJord, FlowGAN, MADE, and MAF (George Papamakarios, kin Murray, and Theo Pavlakou, "Masked Autoregressive Flow for Density Estimation," in *Advances in Neural Information Processing Systems (NIPS)*. Long Beach, Calif., 2338-2347 (2017)). Most of these methods are based on maximum likelihood estimation (MLE). FlowGAN is a hybrid model combining MLE and adversarial loss. Real-NVP, Glow, and FlowGAN rely on revertible coupling layers to preserve the density mass between the input space to latent space. Different from invertible neural network models, MADE and MAF are mask-based neural density estimation methods. For this set of experiments, three convolution layers and one linear layer were used for the generator, the discriminator, and the inference network. More details about the network structures are given in Appendix A.

Figure 6:
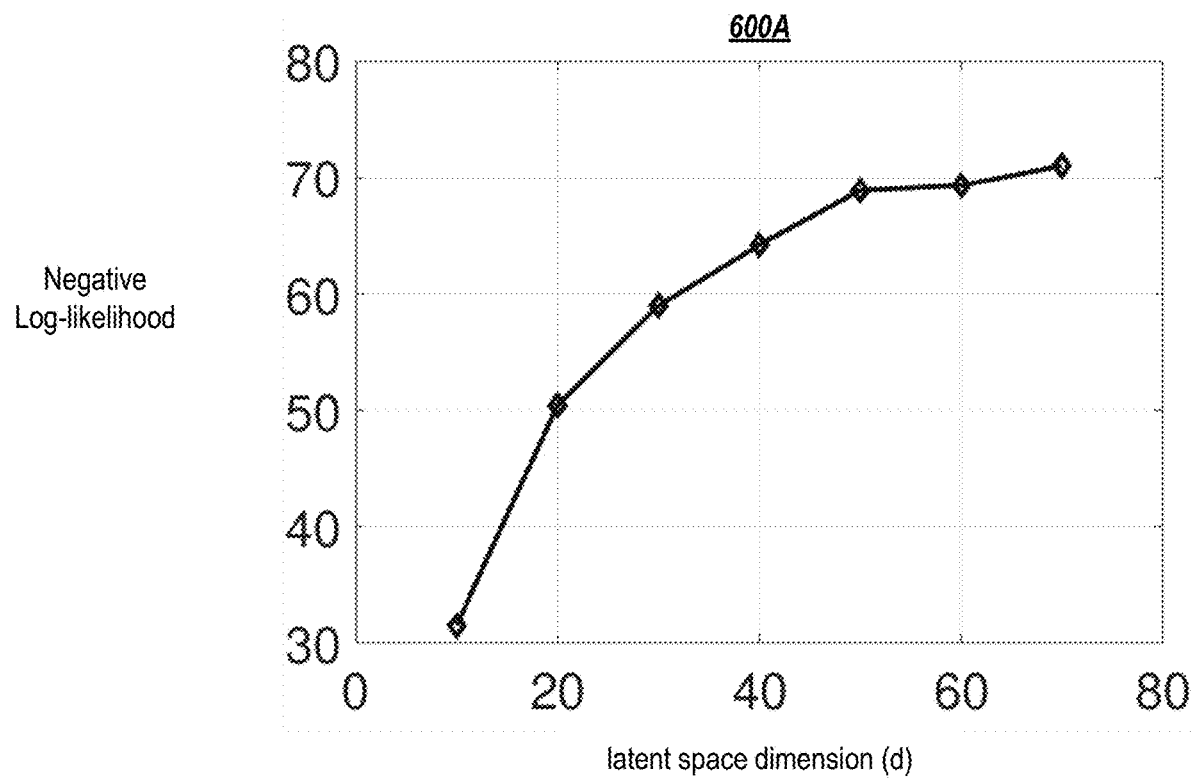
FIG. 6 presents, in a first plot 600A, the average negative log-likelihood values of Data set 1 testing data using the InvGAN embodiment at different latent space dimension (d), and presents, in a second plot 600B, the corresponding bits/dim for the testing set under the revised metric at different d values, according to embodiments of the present disclosure.
Figure 6:
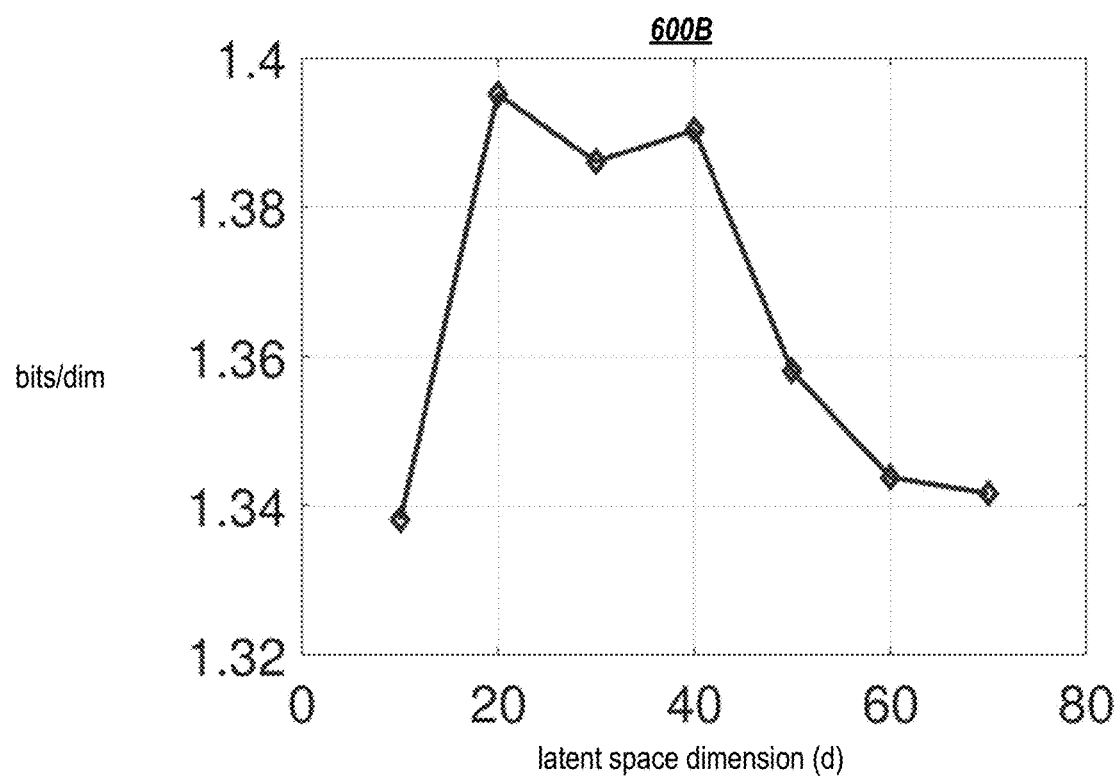

For the InvGAN embodiment, different number of dim($\mathcal{Z}$) may lead to different values of log-likelihood values even for the same data sample (see the top plot 600A in FIG. 6). FIG. 6 presents, in a first plot 600A, the average negative log-likelihood values of Data set 1 testing data using the InvGAN embodiment at different latent space dimension (d) 600A, according to embodiments of the present disclosure. The bits-per-dimension metric, i.e., $-\log p_X(x)/D$, $x \in R^D$, may not apply to the tested embodiment model, as the tested embodiment yields the smallest bits/dim value due the small latent space dimension number used in the model. To fairly compare with the other models, a revised version of bits-per-dimension metric was used in the comparison, which is $-\log p \mathcal{Z}(z)/d + \frac{1}{2} \log(\det(J_g(z)^T J_g(z)))/D$. Here d is the latent space dimension size. With the new metric, the bits/dim of the InvGAN embodiment can be bounded in a reasonable range (as shown the bottom plot 600B of FIG. 6). FIG. 6 presents, in a second plot 600B, the corresponding bits/dim for the testing set under the revised metric at different d value, according to embodiments of the present disclosure. The new metric can compensate the difference resulted from different latent space dimension numbers. For flow or reversible neural network-based density estimation methods, the value of bits-per-dim does change as they take D=d. The experimental setup in FFJord and FlowGAN was followed, and Table 1 compares different methods under the new metric on testing data sets. The likelihood values presented in FFJord and FlowGAN were used. It can be seen that even with the revised metric, the tested embodiment model consistently performed better compared with other models.

3. Anomaly Detection

Figure 7:
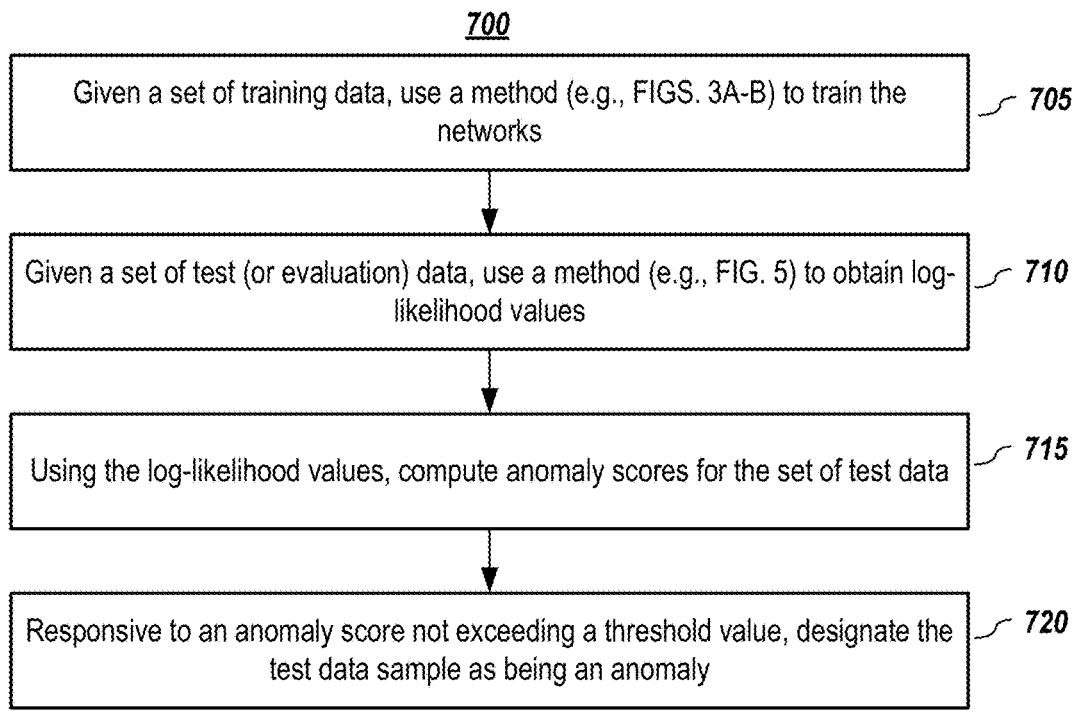
FIG. 7 depicts a method for anomaly detection, according to embodiments of the present disclosure.

FIG. 7 depicts a method for anomaly detection, according to embodiments of the present disclosure. Given a set of training data, a method like that of FIGS. 3A-B may be used to train (705) the networks. Given a set of test data (or evaluation data, i.e., data to be evaluated), a method like that of FIG. 5 may be used to obtain (710) log-likelihood values. In one or more embodiments, the log-likelihood values are used (715) to compute anomaly scores for the set of test data, and responsive to an anomaly score not exceeding a threshold value, the test data sample may be designated (720) as being an anomaly.

TABLE 2

Statistics of the data sets for anomaly detection

| Data Set | Feature | Instance |
|---|---|---|
| Data set 1 | ~1,000 | 60,000 |
| Data set 2 | ~3,000 | 60,000 |
| Data set 3 | ~274 | ~450 |

In this subsection, a likelihood estimation embodiment is used for three anomaly detection tasks. Table 2 gives more details on the three data sets. For all of the results, the anomaly score was defined similar to Samet Akcay, Amir Atapour Abarghouei, and Toby P. Breckon, "GANomaly: Semi-supervised Anomaly Detection via Adversarial Training," in *14th Asian Conference on Computer Vision (ACCV)*. Perth, Australia, 622-637 (2018). With the log-likelihood value set, $S = \{s_i : LLK(x_i), x_i \in \mathcal{T}\}$, the anomaly score is $$s_i' = \frac{s_i - \min S}{\max(S) - \min S}.$$

Here $\mathcal{T}$ is the testing set. The anomaly methods that were compared against an embodiment are given in the next subsection.

a) Baseline Methods

Deep Structured Energy Based Models (DSEBM) (Shuangfei Zhai, Yu Cheng, Weining Lu, and Zhongfei Zhang, "Deep Structured Energy Based Models for Anomaly Detection," in *Proceedings of the 33nd International Conference on Machine Learning (ICML)*. New York, N.Y., 1100-1109 (2016)) are energy-based models for anomaly detection. Similar to denoising auto-encoder, the main idea is to accumulate the energy across layers of neural networks. Two types of anomaly scoring criteria were proposed: energy-based and reconstruction error-based. In the experimental results, DSEBM-r represents results with reconstruction error and DSEBM-e are results with energy-based approach.

Deep Autoencoding Gaussian Mixture Model (DAGMM) (Bo Zong, Qi Song, Martin Renqiang Min, Wei Cheng, Cristian Lumezanu, Dae-ki Cho, and Haifeng Chen, "Deep Autoencoding Gaussian Mixture Model for Unsupervised Anomaly Detection," in *6th International Conference on Learning Representations (ICLR)*. Vancouver, BC, Canada (2018)) is an autoencoder-based method for anomaly detection, and it can achieve state-of-the-art results. In DAGMM, an auto-encoder as well as an estimator network are trained jointly. The auto-encoder is used to generate latent space representations, and the estimator is used to output parameters of a GMM modeling the lower-dimensional latent space. The likelihood value of a sample's latent representation computed with the learned GMM is taken as the anomaly detection metric.

AnoGAN (Thomas Schlegl, Philipp Seebock, Sebastian M. Waldstein, Ursula Schmidt-Erfurth, and Georg Langs, "Unsupervised Anomaly Detection with Generative Adversarial Networks to Guide Marker Discovery," in *Proceedings of 25th International Conference on Information Processing in Medical Imaging (IPMI)*. Boone, N.C., 146-157 (2017)) is a GAN-based method for anomaly detection. The method trains a GAN model to recover a latent representation for each test data sample. The anomaly score is calculated with a combination of the reconstruction error and the discrimination score from the discriminator network. The reconstruction error measures how well the GAN can reconstruct the data via the inferred latent variable and the generator. The authors of AnoGAN compare the two components for the anomaly score and the variant which performed best in the paper was selected.

Efficient GAN-Based Anomaly Detection (EGBAD) (Houssam Zenati, Manon Romain, Chuan-Sheng Foo, Bruno Lecouat, and Vijay Chandrasekhar, "Adversarially Learned Anomaly Detection," in *IEEE International Conference on Data Mining (ICDM)*. Singapore, 727-736 (2018)) is another anomaly detection method based on GAN. Different from AnoGAN, their model learns an inverse function of the generator to speed up the inference of the latent variable. Similar to AnoGAN, the anomaly score in this approach includes two parts: the fitting error from reconstruction and the discrimination score.

GANomaly uses a conditional generative adversarial network that jointly learns the generation of high-dimensional image space and the inference of latent space. Employing encoder-decoder-encoder sub-networks in the generator enables the model to map the input image to a lower dimension vector, which is then used to reconstruct the generated output image. The use of the additional encoder network maps this generated image to its latent representation. Minimizing the distance between these images and the latent vectors during training aids in learning the effective representations for the normal samples.

Adversarially Learned Anomaly Detection (ALAD) (Houssam Zenati, Manon Romain, Chuan-Sheng Foo, Bruno Lecouat, and Vijay Chandrasekhar, "Adversarially Learned Anomaly Detection," in *IEEE International Conference on Data Mining (ICDM)*. Singapore, 727-736 (2018)) is a recently proposed GAN-based anomaly detection method. Similar to EGBAD (Shuangfei Zhai, Yu Cheng, Weining Lu, and Zhongfei Zhang, "Deep Structured Energy Based Models for Anomaly Detection," in *Proceedings of the 33nd International Conference on Machine Learning (ICML)*. New York, N.Y., 1100-1109 (2016)), ALAD learns an encoding function to infer the latent variable for testing samples. Their model is enhanced with three discriminators. With a cycle consistence between sample space and latent space, the training of their model can be stabilized in learning representations for anomaly detection.

One Class Support Vector Machines (OC-SVM) (Bernhard Scholkopf, Robert C. Williamson, Alexander J. Smola, John Shawe-Taylor, and John C. Platt, "Support Vector Method for Novelty Detection," in *Advances in Neural Information Processing Systems (NIPS)*. Denver, Colo., 582-588 (1999)) are a classic kernel method for anomaly detection and density estimation that learns a decision boundary around normal examples. The radial basis function (RBF) kernel is employed in the experiments. The v parameter is set to the expected anomaly proportion in the data set, which is assumed to be known, whereas the γ parameter is set to be inversely proportional to the number of input features.

Isolation Forests (IF) (Fei Tony Liu, Kai Ming Ting, and Zhi-Hua Zhou, "Isolation Forest," in *Proceedings of the 8th IEEE International Conference on Data Mining (ICDM)*. Pisa, Italy, 413-422 (2008)) are a classic machine learning technique that isolates abnormal samples rather than learning the distribution of normal data. The method constructs trees across randomly chosen features according to randomly split values. The anomaly score is defined as the average path length from a testing sample to the root. The experiments results for this model were obtained with the implementation in the scikit-learn package.

a) Data Set 1

Figure 8:
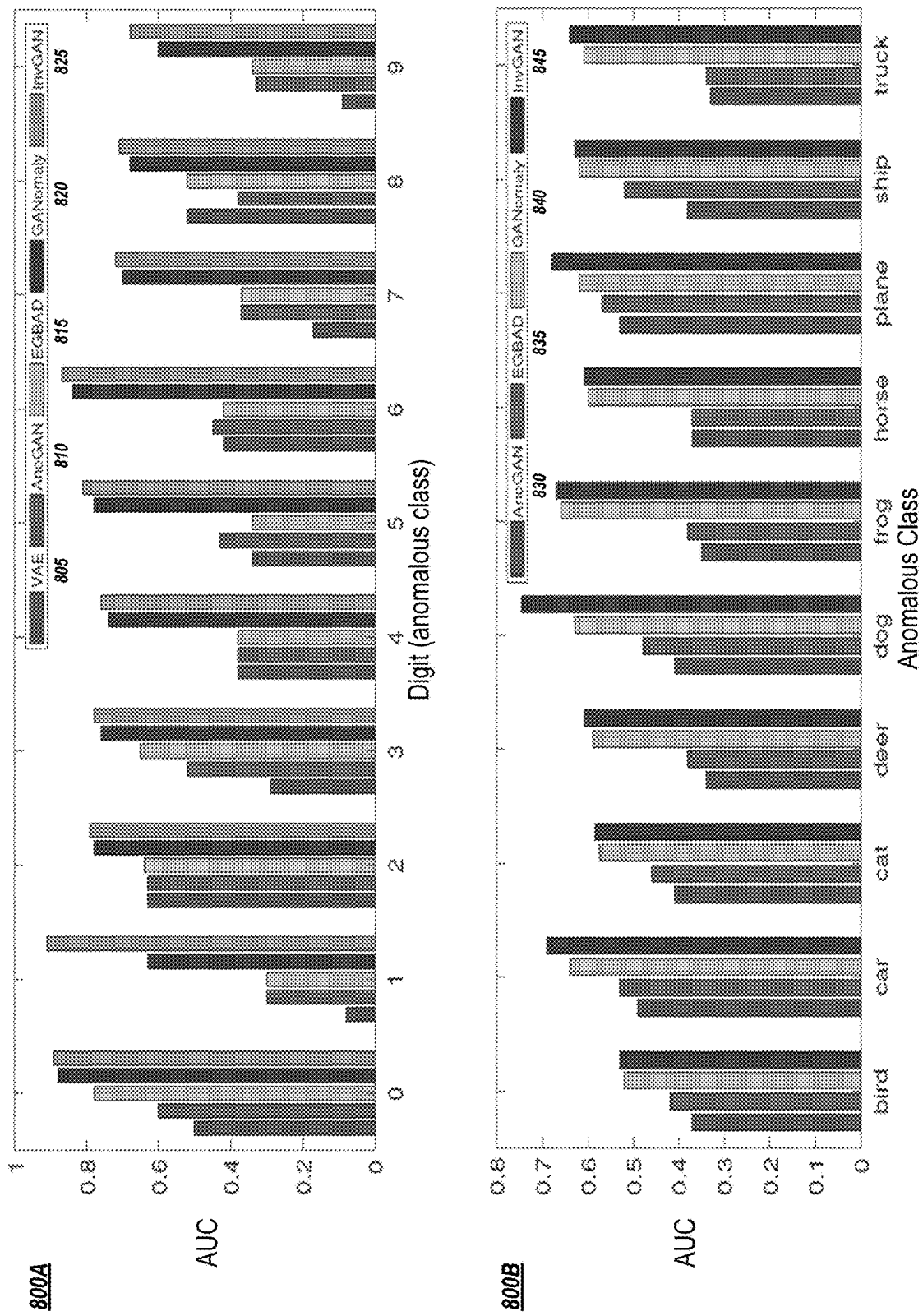
FIG. 8 depicts anomaly detection with different models on Data sets 1 and 2, according to embodiments of the present disclosure.

One class of the ten numbers in Data set 1 were taken as the abnormal class, and the rest classes were taken as the normal class. In the training phase, the images from the nine normal classes were to train GAN and an embodiment of the present disclosure. In the testing state, the images from all ten classes in the testing set were used. The experiment set up followed GANomaly. The results for GANomaly were obtained by running the online code with the optimal parameters given in the script. The results for the other methods were based on the result section in GANomaly, referenced above. The upper plot 800A in FIG. 8 shows the results of all of the methods on ten classes. Note that the order in each set of five bars in plot 800A is the same: VAE, AnoGAN, EGBAD, GANomaly, and a tested embodiment, which is labeled as InvGAN. The tested embodiment method, InvGAN, outperforms the other methods in all the ten tasks.

b) Data Set 2

Similar to Data set 1, one class was taken as the abnormal class, and the rest of the classes were taken as normal. The experimental set up as in the GANomaly document, cited above. The testing involved samples from both the normal classes and the abnormal class in the testing data set. As shown in the lower plot 800B in FIG. 8, the tested embodiment method, InvGAN, leads the best results in all ten anomaly detection tasks, especially for the class dog. Note that the order in each set of four bars in plot 800B is the same: AnoGAN, EGBAD, GANomaly, and a tested embodiment, which is labeled as InvGAN. The anomaly detection results on two real data sets show that the tested embodiment model can perform well on the variance estimation for the distribution samples and outliers.

TABLE 3

Anomaly detection on Data set 1 and Data set 2

| Data Set | Model | AUROC |
|---|---|---|
| DATA SET 1 | VAE | 0.3420 ± 0.1861 |
| | AnoGAN | 0.4390 ± 0.116 |
| | GANomaly | 0.7390 ± 0.0882 |
| | InvGAN | 0.7920 ± 0.0786 |
| DATA SET 2 | OC-SVM* | 0.5843 ± 0.0956 |
| | IF* | 0.6025 ± 0.1040 |
| | DSEBM-r* | 0.6071 ± 0.1007 |
| | DSEBM-e* | 0.5956 ± 0.1151 |
| | ALAD* | 0.6072 ± 0.1201 |
| | AnoGAN | 0.5949 ± 0.1076 |
| | EGBAD | 0.4450 ± 0.0786 |
| | GANomaly | 0.6065 ± 0.0390 |
| | InvGAN | 0.6391 ± 0.0608 |

Table 3 presents comparison among different anomaly detection methods for both image data sets. The experimental setups for AnoGAN, EGBAD, GANomaly, and the proposed InvGAN were the same and follow the GANomaly document, cited above. In order to obtain a comprehensive comparison with existing methods, some anomaly detection results for Data set 2 (models marked with * in Table 3) were also included.

It was noticed that there were some small experimental differences between ALAD and what was used here for Data set 2. In the ALAD document, they take one class as the normal one, and the rest classes as the abnormal ones. Anomaly detection is essentially a binary classification problem. The numerical results in Table 3 can validate the significance of the tested model embodiment. In summary, the tested method embodiment outperforms the other autoencoder and GAN based approaches for both data sets. More details about the implementation of the networks are given in Appendix A.

c) Data Set 4

Figure 9:
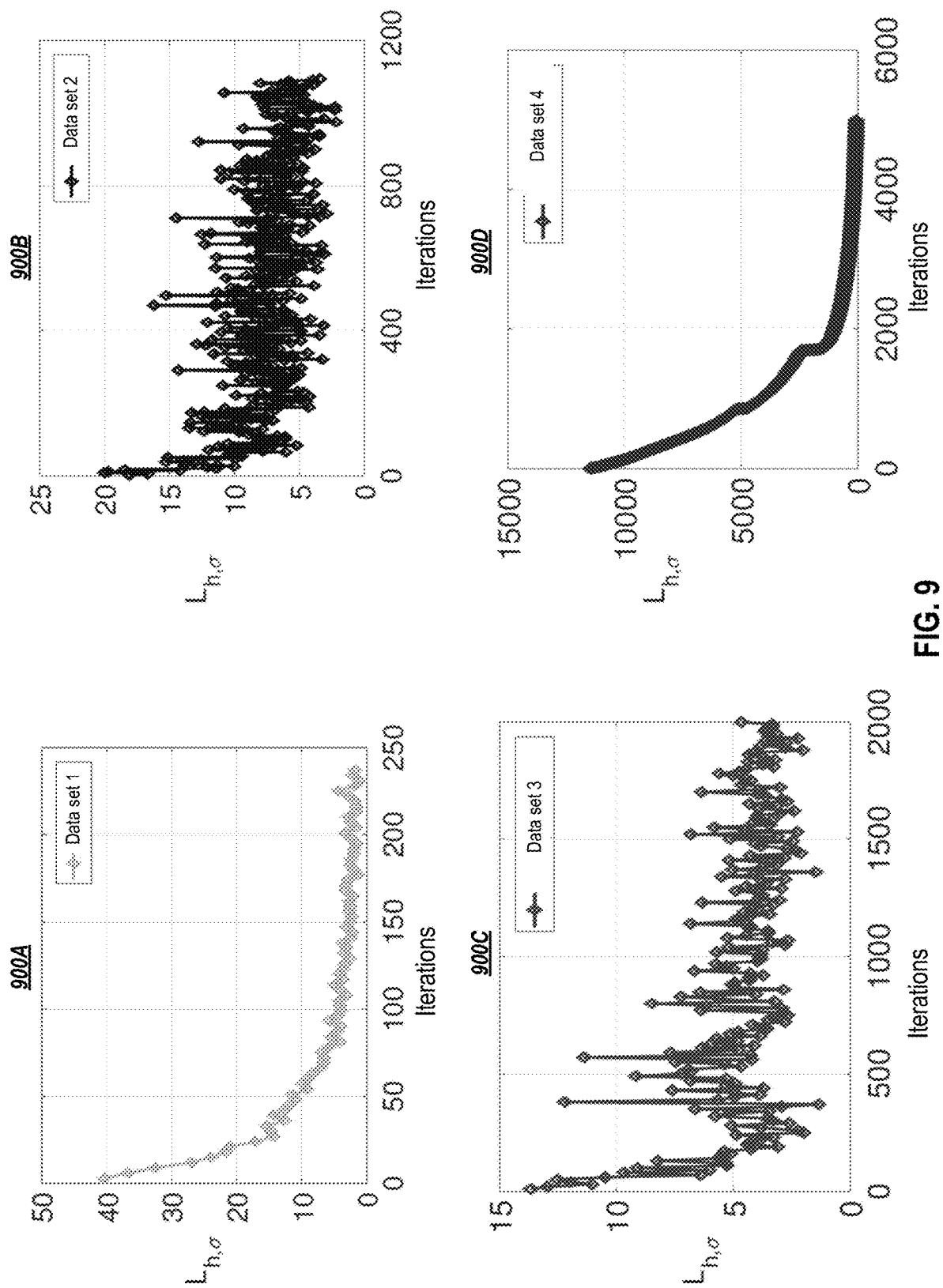
FIG. 9 depicts $L_{h,o}$ at different iterations for the four data sets, according to embodiments of the present disclosure.

An embodiment was further tested on a tabular data set. The smallest classes were combined to form the anomaly class, and the rest of the classes were combined to form the normal class. Table 4 shows the anomaly detection results with different methods. Due to the small training set, classic methods outperform deep generative models on precision and F1 score. However, the tested method embodiment achieved the highest recall values and a high F1 score as well. With the help of the variance network, the tested embodiment was relatively robust compared with other deep neural network methods. More details about the implementation of the InvGAN embodiment can be found in Appendix B. FIG. 9 gives the convergence of the loss $L_{h,\sigma}$ for different data sets: 900A (Data set 1), 900B (Data set 2), 900C (Data set 3), and 900D (Data set 4).

TABLE 4

Anomaly detection on Data set 4

| Data Set | Model | Precision | Recall | F1 Score |
|---|---|---|---|---|
| Data set 4 | OC-SVM | 0.5397 | 0.4082 | 0.4581 |
| | IF | 0.5147 | 0.5469 | 0.5303 |
| | DSEBM-r | 0.1515 | 0.1513 | 0.1510 |
| | DSEBM-e | 0.4667 | 0.4565 | 0.4601 |
| | DAGMM | 0.4909 | 0.5078 | 0.4983 |
| | AnoGAN | 0.4118 | 0.4375 | 0.4242 |
| | ALAD | 0.5000 | 0.5313 | 0.5152 |
| | InvGAN | 0.4390 | 0.6000 | 0.5070 |

E. SOME OBSERVATIONS

In this patent document, embodiments of an approach to estimate the implicit likelihoods of GANs were presented. In one or more embodiments, by leveraging an inference function and a variance network of the generator, the likelihoods of testing samples can be estimated. Simulation study and likelihood testing on data sets validate the advantages of embodiments. An embodiment was further applied to three anomaly detection tasks. Experimental results show that the tested embodiment can outperform classic and other deep neural network-based anomaly detection methods.

F. APPENDICES

1. Appendix A—Network Structures for Image Data Sets

The generator, discriminator, and the inference network for Data set 1 and Data set 2 are given in Tables 5, 6, and 7. In the experiments, for Data set 3 the same network structure was used as with Data set 2, and it is not stated in the tables.

TABLE 5

Generator of InvGAN in likelihood and anomaly detection experiments for Data set 1 and Data set 2
Generator

| Layer | Number of Output | Kernel | Stride | Activation function |
|---|---|---|---|---|
| Input z ~ N (0, 1)$^{50}$ | 50 | | | |
| Fully-Connected | 128*4*4 | | | ReLU |
| Transposed convolution | 128*8*8 | 4*4 | 2 | ReLU |

TABLE 5-continued

Generator of InvGAN in likelihood and anomaly detection experiments for Data set 1 and Data set 2
Generator

| Layer | Number of Output | Kernel | Stride | Activation function |
|---|---|---|---|---|
| Transposed convolution | 64*16*16 | 4*4 | 2 | ReLU |
| Transposed convolution | 1*32*32 (Data set 1) | 4*4 | 2 | Tanh |
| | 3*32*32 (Data set 2) | 4*4 | 2 | Tanh |

TABLE 6

Discriminator of the InvGAN embodiment in likelihood and anomaly detection experiments for Data set 1 and Data set 2
Generator

| Layer | Number of Output | Kernel | Stride | Activation function |
|---|---|---|---|---|
| Input x | 1*32*32 (Data set 1) | | | |
| | 3*32*32 (Data set 2) | | | |
| Convolution | 64*16*16 | 4*4 | 2 | ReLU |
| Convolution | 128*8*8 | 4*4 | 2 | ReLU |
| Convolution | 128*4*4 | 4*4 | 2 | ReLU |
| Fully-Connected | 1 | 1 | | Sigmoid |

TABLE 7

Inference network of the InvGAN embodiment in likelihood and anomaly detection experiments for Data set 1 and Data set 2
Generator

| Layer | Number of Output | Kernel | Stride | Activation function |
|---|---|---|---|---|
| Input x | 1*32*32 (Data Set 1) | | | |
| | 3*32*32 (Data Set 2) | | | |
| Convolution | 64*16*16 | 4*4 | 2 | ReLU |
| Convolution | 128*8*8 | 4*4 | 2 | ReLU |
| Convolution | 128*4*4 | 4*4 | 2 | ReLU |
| Fully-Connected | 50 | 50 | | |

2. Appendix B—Network Structures for Data Set 4

The network structures for the generator, the discriminator, and the inference network in the Data set 4 experiments are given in Tables 8, 9, and 10, respectively.

TABLE 8

Generator of the InvGAN embodiment in Data set 4 anomaly detection experiments
Generator

| Layer | Number of Output | Batch Normalization | Activation function |
|---|---|---|---|
| Input z ~ N (0, 1)$^{z\_dim}$ | 50 | | |
| Fully-Connected | 128 | Y | ReLU |
| Fully-Connected | 256 | Y | ReLU |
| Fully-Connected | 274 | | |

TABLE 9

Discriminator of the InvGAN embodiment in
Data set 4 anomaly detection experiments
Discriminator

| Layer | Number of Output | Batch Normalization | Activation function |
|---|---|---|---|
| Input x | 274 | | |
| Fully-Connected | 256 | Y | ReLU |
| Fully-Connected | 128 | Y | ReLU |
| Fully-Connected | 1 | | Sigmoid |

TABLE 10

Inference network of the InvGAN embodiment in
Data set 4 anomaly detection experiments
Inference Network

| Layer | Number of Output | Batch Normalization | Activation function |
|---|---|---|---|
| Input x | 274 | | |
| Fully-Connected | 256 | Y | ReLU |
| Fully-Connected | 128 | Y | ReLU |
| Fully-Connected | 50 | | |

G. COMPUTING SYSTEM EMBODIMENTS

In one or more embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 10:
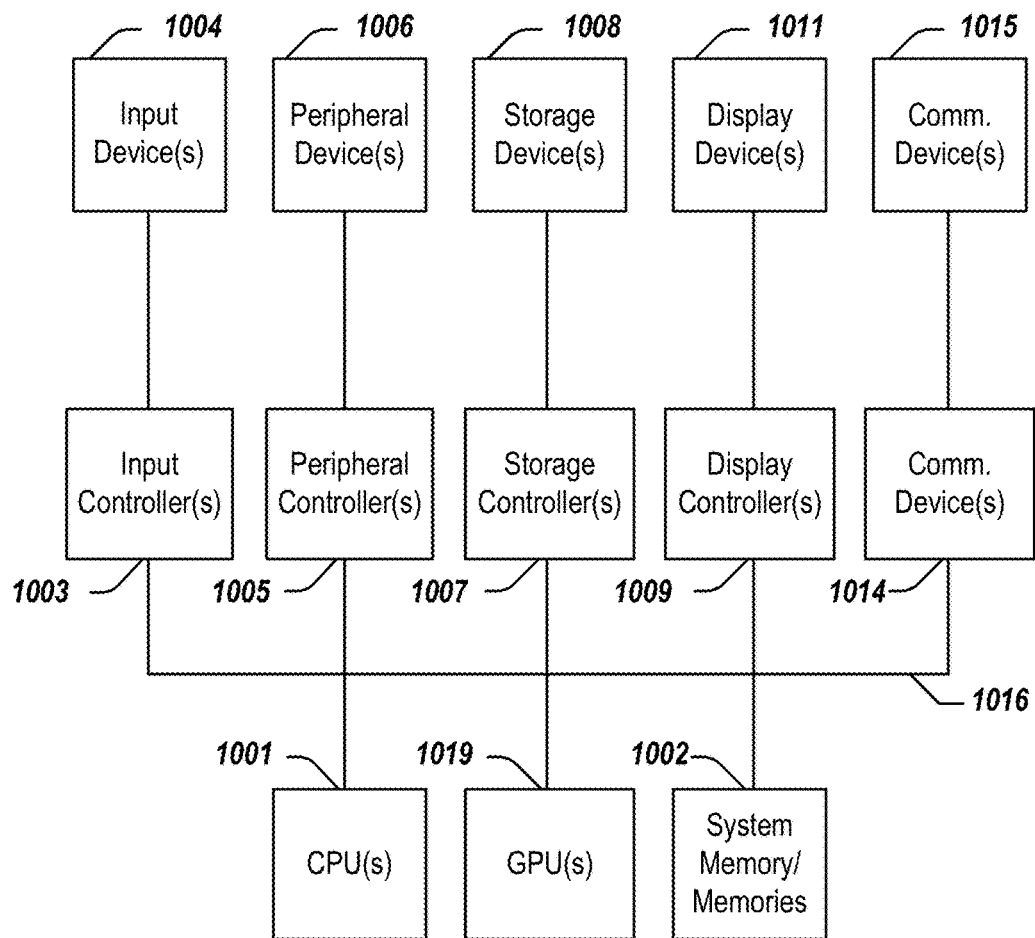
FIG. 10 depicts a simplified block diagram of a computing device/information handling system, according to embodiments of the present disclosure.

FIG. 10 depicts a simplified block diagram of a computing device/information handling system (or computing system) according to embodiments of the present disclosure. It will be understood that the functionalities shown for system 1000 may operate to support various embodiments of a computing system—although it shall be understood that a computing system may be differently configured and include different components, including having fewer or more components as depicted in FIG. 10.

As illustrated in FIG. 10, the computing system 1000 includes one or more central processing units (CPU) 1001 that provides computing resources and controls the computer. CPU 1001 may be implemented with a microprocessor or the like, and may also include one or more graphics processing units (GPU) 1019 and/or a floating-point coprocessor for mathematical computations. System 1000 may also include a system memory 1002, which may be in the form of random-access memory (RAM), read-only memory (ROM), or both.

A number of controllers and peripheral devices may also be provided, as shown in FIG. 10. An input controller 1003 represents an interface to various input device(s) 1004, such as a keyboard, mouse, touchscreen, and/or stylus. The computing system 1000 may also include a storage controller 1007 for interfacing with one or more storage devices 1008 each of which includes a storage medium such as magnetic tape or disk, or an optical medium that might be used to record programs of instructions for operating systems, utilities, and applications, which may include embodiments of programs that implement various aspects of the present disclosure. Storage device(s) 1008 may also be used to store processed data or data to be processed in accordance with the disclosure. The system 1000 may also include a display controller 1009 for providing an interface to a display device 1011, which may be a cathode ray tube (CRT), a thin film transistor (TFT) display, organic light-emitting diode, electroluminescent panel, plasma panel, or other type of display. The computing system 1000 may also include one or more peripheral controllers or interfaces 1005 for one or more peripherals 1006. Examples of peripherals may include one or more printers, scanners, input devices, output devices, sensors, and the like. A communications controller 1014 may interface with one or more communication devices 1015, which enables the system 1000 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media may include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means"

terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for training a generative adversarial network system, the method comprising:
responsive to a stop condition not being reached, repeating steps for training a generative adversarial network system comprising a generator network, a discriminator network, an inference network, and a variance network, the steps comprising:
sampling a first minibatch of input data samples from an input data set;
sampling a first minibatch of latent variable values from a latent variable prior distribution;
updating the discriminator network using a first loss function that involves the first minibatch of input data samples and the first minibatch of latent variable values;
sampling a second minibatch of latent variable values from the latent variable prior distribution;
updating the generator network using a second loss function that involves the second minibatch of latent variable values;
sampling a second minibatch of input data samples from the input data set;
updating the inference network and the variance network using a third loss function that involves the second minibatch of input data samples;
sampling a third minibatch of latent variable values from the latent variable prior distribution; and
updating the inference network and the generator network using a fourth loss function that involves the third minibatch of latent variable values; and
responsive to a stop condition being reached, outputting an updated generator network, a trained an updated inference network, and an updated variance network.

2. The computer-implemented method of claim 1 further comprising the step of:
obtaining a plurality of clusters of latent variable values by sampling a number of latent variable values from the latent variable prior distribution and using K-means clustering to obtain the plurality of clusters.

3. The computer-implemented method of claim 1 wherein the step of updating the inference network comprises:
training the inference network to map a given input data sample in an input space to a latent variable value that can be mapped back to a value within a region of the input data sample in a manifold.

4. The computer-implemented method of claim 1 wherein the third loss function comprises:
a difference between a generator network estimate of an input data sample using as an input an estimate of a latent variable value obtained using the inference network and the input data sample.

5. The computer-implemented method of claim 4 wherein the third loss function further comprises:
for the input data sample, determining a variance value using the variance network operating on the estimate of the latent variable value obtained using the inference network and the input data sample.

6. The computer-implemented method of claim 1 wherein the fourth loss function comprises:
a difference between a sampled latent variable value and an estimate of the sampled latent variable value obtained from the inference network using as an input an estimate of an input data sample for the sampled latent variable, in which the estimate of the input data sample is obtained from the generator network and the sampled latent variable value.

7. A computer-implemented method for likelihood estimation of data, the method comprising:
obtain a set of latent variable values corresponding to a set of input data values using a trained inference network, which has been trained to map an input data value to a latent variable value that can be mapped back to a value within a region of the input data value in a manifold using a trained generator network;
inputting the set of latent variable values into the trained generator network and a trained variance network, which has been trained to map a latent variable to a variance value in an input space;

determining a set of Riemannian metric matrices using one or more Jacobian matrices for the trained generator network and the trained variance network regarding the set of latent variable values; and determining log-likelihood values for the set of input data values using the set of Riemannian metric matrices and log-likelihood values of the set of latent variable values.

8. The computer-implemented method of claim 7 wherein the trained generator network, the trained inference network, and the trained variance network were obtained by training a Generative Adversarial Network (GAN) system that comprised the generator network, the inference network, and the variance network.

9. The computer-implemented method of claim 8 wherein the step of training the GAN system that comprises the generator network, the inference network, and the variance network comprises the steps of:

responsive to a stop condition not being reached, repeating steps for training the GAN system comprising the generator network, a discriminator network, the inference network, and the variance network, the steps comprising:
sampling a minibatch of input data samples from an input data set;
sampling a minibatch of latent variable values from a latent variable prior distribution;
updating the discriminator network using first loss function;
sampling a second minibatch of latent variable values from the latent variable prior distribution;
updating the generator network using a second loss function;
sampling a second minibatch of input data samples from the input data set;
updating the inference network and the variance network using a third loss function;
sampling a third minibatch of latent variable values from the latent variable prior distribution; and
updating the inference network and the generator network using a fourth loss function; and
responsive to a stop condition being reached, outputting the trained generator network, the trained inference network, and the trained variance network.

10. The computer-implemented method of claim 9 further comprising:
obtaining a plurality of clusters of latent variable values by sampling a number of latent variable values from the latent variable prior distribution and using K-means clustering to obtain the plurality of clusters.

11. The computer-implemented method of claim 9 wherein the third loss function comprises:
a difference between the generator network estimate of an input data sample using as an input the estimate of a latent variable value obtained using the inference network and the input data sample.

12. The computer-implemented method of claim 11 wherein the third loss function further comprises:
for the input data sample, determining a variance value using the variance network operating on the estimate of the latent variable value obtained using the inference network and the input data sample.

13. The computer-implemented method of claim 9 wherein the fourth loss function comprises:
a difference between a sampled latent variable value and an estimate of the sampled latent variable value obtained from the inference network using as an input an estimate of an input data sample for the sampled latent variable, in which the estimate of the input data sample is obtained from the generator network and the sampled latent variable value.

14. A computer-implemented method for anomaly detection, the method comprising:
obtain a set of latent variable values corresponding to a set of input data values using a trained inference network, which has been trained to map an input data value to a latent variable value that can be mapped back to a value within a region of the input data value in a manifold using a trained generator network;
inputting the set of latent variable values into the trained generator network and a trained variance network, which has been trained to map a latent variable to a variance value in an input space;
determining a set of Riemannian metric matrices using one or more Jacobian matrices for the trained generator network and the trained variance network regarding the set of latent variable values;
determining log-likelihood values for the set of input data values using the set of Riemannian metric matrices and log-likelihood values of the set of latent variable values;
using at least some of the log-likelihood values to determine corresponding anomaly scores corresponding to the set of input data values; and
responsive to an anomaly score not exceeding a threshold value, designating the input data value corresponding to the anomaly score as being an anomaly.

15. The computer-implemented method of claim 14 wherein the trained generator network, the trained inference network, and the trained variance network were obtained by training a Generative Adversarial Network (GAN) system that comprised the generator network, the inference network, and the variance network.

16. The computer-implemented method of claim 15 wherein the step of training the GAN system that comprises the generator network, the inference network, and the variance network comprises the steps of:

responsive to a stop condition not being reached, repeating steps for training the GAN system comprising the generator network, a discriminator network, the inference network, and the variance network, the steps comprising:
sampling a minibatch of input data samples from an input data set;
sampling a minibatch of latent variable values from a latent variable prior distribution;
updating the discriminator network using first loss function;
sampling a second minibatch of latent variable values from the latent variable prior distribution;
updating the generator network using a second loss function;
sampling a second minibatch of input data samples from the input data set;
updating the inference network and the variance network using a third loss function;
sampling a third minibatch of latent variable values from the latent variable prior distribution; and
updating the inference network and the generator network using a fourth loss function; and
responsive to a stop condition being reached, outputting the generator network, the inference network, and the variance network.

17. The computer-implemented method of claim 16 further comprising:
  obtaining a plurality of clusters of latent variable values by sampling a number of latent variable values from the latent variable prior distribution and using K-means clustering to obtain the plurality of clusters.

18. The computer-implemented method of claim 16 wherein the third loss function comprises:
  a difference between a generator network estimate of an input data sample using as an input an estimate of a latent variable value obtained using the inference network and the input data sample.

19. The computer-implemented method of claim 18 wherein the third loss function further comprises:
  for the input data sample, determining a variance value using the variance network operating on the estimate of the latent variable value obtained using the inference network and the input data sample.

20. The computer-implemented method of claim 16 wherein the fourth loss function comprises:
  a difference between a sampled latent variable value and an estimate of the sampled latent variable value obtained from the inference network using as an input an estimate of an input data sample for the sampled latent variable, in which the estimate of the input data sample is obtained from the generator network and the sampled latent variable value.

* * * * *